(12) United States Patent
Vinish

(10) Patent No.: US 12,546,915 B1
(45) Date of Patent: Feb. 10, 2026

(54) MICRO-LED BEAM TUNING

(71) Applicant: Meta Platforms Technologies, LLC, Menlo Park, CA (US)

(72) Inventor: Yaniv Vinish, Carrigtwohill (IE)

(73) Assignee: Meta Platforms Technologies, LLC, Menlo Park, CA (US)

( * ) Notice: Subject to any disclaimer, the term of this patent is extended or adjusted under 35 U.S.C. 154(b) by 693 days.

(21) Appl. No.: 17/959,241

(22) Filed: Oct. 3, 2022

(51) Int. Cl.
*G02B 3/00* (2006.01)
(52) U.S. Cl.
CPC ................... *G02B 3/0056* (2013.01)
(58) Field of Classification Search
CPC ..................................... G02B 3/0056
See application file for complete search history.

(56) References Cited

U.S. PATENT DOCUMENTS

2021/0159373 A1\* 5/2021 Grundmann ............ H01L 24/80

\* cited by examiner

*Primary Examiner* — James C. Jones
(74) *Attorney, Agent, or Firm* — Greenberg Traurig, LLP

(57) ABSTRACT

A near-eye display includes a light source including an array of micro light emitting diodes (micro-LEDs) configured to emit light beams, display optics configured to project the light beams emitted by the array of micro-LEDs to a user's eye, and an array of optical elements between the array of micro-LEDs and the display optics. The array of optical elements is configured to extract and direct the light beams emitted by the array of micro-LEDs towards the display optics. An optical element of the array of optical elements is configured to deflect a light beam emitted by a micro-LED of the array of micro-LEDs at a deflection angle that is greater than 0° and is smaller than the chief ray angle from the micro-LED.

20 Claims, 21 Drawing Sheets

FIG. 19A

| FWHM (deg) / CRA (deg) | 5 | 10 | 15 | 20 | 25 | 30 |
|---|---|---|---|---|---|---|
| 10 | 5 | 10 | 15 | 20 | 25 | 30 |
| 20 | 5 | 10 | 15 | 20 | 25 | 30 |
| 30 | 5 | 10 | 15 | 20 | 25 | 30 |
| 40 | 5 | 10 | 15 | 20 | 25 | 30 |
| 50 | 5 | 10 | 15 | 20 | 25 | 30 |
| 60 | 5 | 10 | 15 | 20 | 25 | 30 |
| 70 | 5 | 10 | 15 | 20 | 25 | 30 |
| 80 | 5 | 10 | 15 | 20 | 25 | 30 |

FIG. 19B

| FWHM (deg) / CRA (deg) | 5 | 10 | 15 | 20 | 25 | 30 |
|---|---|---|---|---|---|---|
| 10 | 5 | 5 | 10 | 15 | 20 | 25 |
| 20 | 5 | 10 | 10 | 15 | 20 | 20 |
| 30 | 5 | 5 | 10 | 15 | 15 | 20 |
| 40 | 5 | 10 | 10 | 15 | 15 | 15 |
| 50 | 5 | 5 | 10 | 10 | 15 | 15 |
| 60 | 0 | 5 | 5 | 5 | 10 | 10 |
| 70 | 0 | 5 | 5 | 5 | 10 | 10 |
| 80 | 0 | 5 | 5 | 5 | 5 | 10 |

FIG. 19C

| FWHM (deg) / CRA (deg) | 5 | 10 | 15 | 20 | 25 | 30 |
|---|---|---|---|---|---|---|
| 10 | 0 | 5 | 5 | 5 | 5 | 10 |
| 20 | 0 | 0 | 5 | 5 | 10 | 10 |
| 30 | 0 | 5 | 5 | 5 | 10 | 10 |
| 40 | 0 | 5 | 10 | 10 | 10 | 15 |
| 50 | 0 | 5 | 10 | 10 | 10 | 15 |
| 60 | 5 | 5 | 10 | 15 | 15 | 20 |
| 70 | 5 | 5 | 10 | 15 | 15 | 20 |
| 80 | 5 | 5 | 10 | 15 | 20 | 20 |

FIG. 19D

| FWHM (deg) / CRA (deg) | 5 | 10 | 15 | 20 | 25 | 30 |
|---|---|---|---|---|---|---|
| 10 | 100 | 50 | 67 | 75 | 80 | 67 |
| 20 | 100 | 100 | 67 | 75 | 80 | 67 |
| 30 | 100 | 50 | 67 | 75 | 60 | 50 |
| 40 | 100 | 50 | 67 | 50 | 60 | 50 |
| 50 | 0 | 50 | 33 | 50 | 40 | 33 |
| 60 | 0 | 50 | 33 | 25 | 40 | 33 |
| 70 | 0 | 50 | 33 | 25 | 40 | 33 |
| 80 | 0 | 50 | 33 | 25 | 20 | 33 |

MICRO-LED BEAM TUNING

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). The display system generally includes one or more light sources that can be driven to output light at various luminance levels to form display images, such as light-emitting diodes (LEDs), organic LEDs (OLEDs), quantum dot LEDs (QLEDs), Quantum Dot Electro Luminescent (QDEL) devices, and Perovskite LEDs (PeLEDs). For example, semiconductor micro-LEDs that emit light of different colors (e.g., red, green, and blue) can be used to form the sub-pixels of a near-eye display system, due to their small size (e.g., with a linear dimension less than about 50 µm, less than about 20 µm, less than 10 µm, or less than 5 µm), high packing density (and hence higher resolution), and high brightness.

SUMMARY

This disclosure relates generally to near-eye displays such as head-mounted displays. More specifically, and without limitation, techniques disclosed herein relate to improving the coupling efficiencies of light beams emitted by micro-LEDs in a near-eye display by deflecting the light beams at deflection angles that may be different from the chief ray angles and may be determined based on beam profiles of the light beams and positions of the micro-LEDs with respect to the display optics (or the chief ray angles from the micro-LEDs). Various inventive embodiments are described herein, including devices, systems, methods, structures, materials, processes, and the like.

According to certain embodiments, a near-eye display system may include a light source including an array of micro light emitting diodes (micro-LEDs) configured to emit light beams, display optics configured to project the light beams emitted by the array of micro-LEDs to a user's eye, and an array of optical elements between the array of micro-LEDs and the display optics. The array of optical elements may be configured to extract and direct the light beams emitted by the array of micro-LEDs towards the display optics. An optical element of the array of optical elements may be configured to deflect a light beam emitted by a micro-LED of the array of micro-LEDs at a deflection angle that is greater than 0° and is smaller than 90% of a chief ray angle from the micro-LED.

In some embodiments of the near-eye display, the deflection angle may be equal to or less than 80% of the chief ray angle, and may be equal to or greater than 20% of the chief ray angle. In some embodiments, the deflection angle may be less than 50% of the chief ray angle. The difference between the deflection angle and the chief ray angle may increase as the chief ray angle increases. In some embodiments, the array of optical elements may be configured to deflect light beams from the array of micro-LEDs by different deflection angles that gradually increase from a center of the array of micro-LEDs to an edge of the array of micro-LEDs. The deflection angle may be selected based on the chief ray angle and a beam profile of the light beam. In some embodiments, a full-width-half-magnitude angular range of a beam profile of the light beam is equal to or greater than 40°.

In some embodiments of the near-eye display, the array of optical elements may include an array of micro-lenses, where each micro-lens of the array of micro-lenses may correspond to a micro-LED of the array of micro-LEDs, and at least one micro-lens of the array of micro-lenses may be displaced with respect to a corresponding micro-LED of the array of micro-LEDs. In some embodiments, the array of micro-lenses may be characterized by a non-uniform pitch. In some embodiments, the pitch of the array of micro-LEDs may be non-uniform. In some embodiments, the array of optical elements may be configured to direct light beams emitted from a zone of the array of micro-LEDs by a same deflection angle. The array of optical elements may include prisms, gratings, refractive lenses, diffractive lenses, or geometric phase lenses. The array of micro-LEDs may include, for example, an array of micro-organic light emitting diodes (micro-OLEDs), or an array of III-V semiconductor micro-LEDs.

According to certain embodiments, a near-eye display system may include a light source including an array of micro light emitting diodes (micro-LEDs) configured to emit light beams, an array of micro-lenses on the array of micro-LEDs, and display optics configured to receive and project the light beams directed by the array of micro-lenses to a user's eye. Each micro-lens of the array of micro-lenses may correspond to a micro-LED of the array of micro-LEDs and may be configured to extract and direct a light beam emitted by the micro-LED. A micro-lens of the array of micro-lenses may be displaced from the corresponding micro-LED of the array of micro-LEDs and may be configured to deflect a light beam emitted by the corresponding micro-LED at a deflection angle smaller than a chief ray angle from the micro-LED.

In some embodiments of the near-eye display system, a difference between the deflection angle and the chief ray angle may increase as the chief ray angle increases. In some embodiments, the deflection angle may be equal to or less than 80% of the chief ray angle, and may be equal to or greater than 20% of the chief ray angle. The deflection angle may be selected based on the chief ray angle and a beam profile of the light beam. In some embodiments, a pitch of the array of micro-lenses may be non-uniform, a pitch of the array of micro-LEDs may be nonuniform, or both the pitch of the array of micro-lenses and pitch of the array of micro-LEDs may be non-uniform. In some embodiments, the array of micro-lenses may be configured to direct light beams emitted from a zone of the array of micro-LEDs by a same deflection angle. In some embodiments, a displacement between the micro-lens and the corresponding micro-LED may be non-uniform across the array of micro-LEDs.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 19A illustrates examples of deflecting light beams emitted from an array of micro-LEDs by an array of micro-lenses at angles matching the chief ray angles from the micro-LEDs.

FIG. 19B illustrates examples of deflecting light beams emitted from an array of micro-LEDs by an array of micro-lenses at angles equal to or smaller than the chief ray angles from the micro-LEDs based on the beam profiles of the emitted light beams according to certain embodiments.

FIG. 19C illustrates the differences (in degrees) between the deflection angles of the light beams emitted from an array of micro-LEDs and deflected by an array of micro-lenses shown in FIG. 19B and the chief ray angles from the micro-LEDs for different beam profiles of the emitted light beams according to certain embodiments.

FIG. 19D illustrates ratios (in percentage) between the deflection angles of the light beams emitted from an array of micro-LEDs by an array of micro-lenses shown in FIG. 19B and the chief ray angles from the micro-LEDs for different beam profiles of the emitted light beams according to certain embodiments.

Figure 1:
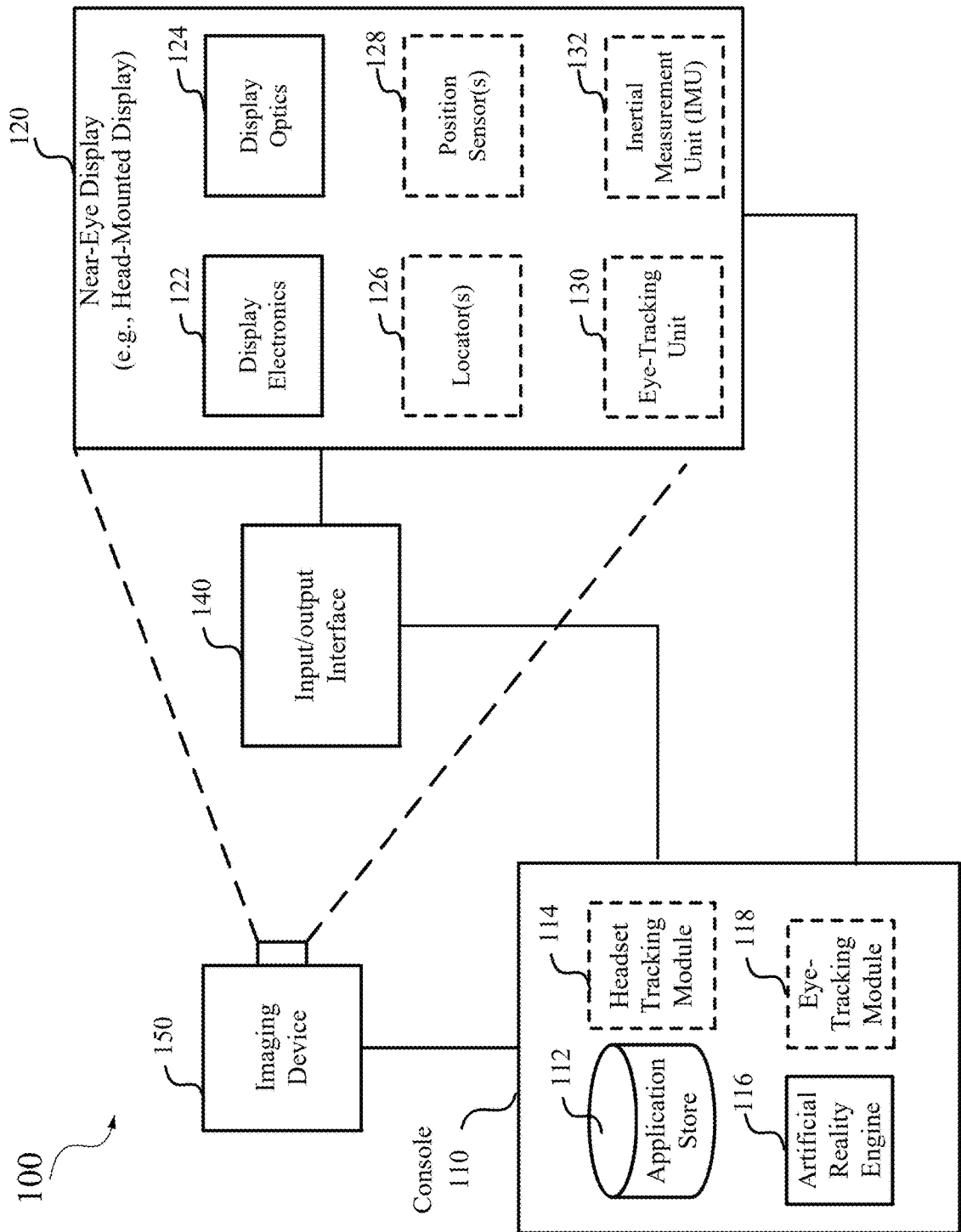
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to near-eye displays such as head-mounted displays. More specifically, and without limitation, techniques disclosed herein relate to improving the coupling efficiencies of light beams emitted by micro-LEDs in a near-eye display by deflecting the light beams at deflection angles that may be different from the chief ray angles and may be determined based on beam profiles of the light beams and positions of the micro-LEDs with respect to the display optics (or the chief ray angles from the micro-LEDs). Various inventive embodiments are described herein, including devices, systems, methods, structures, materials, processes, and the like.

Augmented reality (AR) and virtual reality (VR) applications may use near-eye displays (e.g., head-mounted displays) that include arrays of tiny monochrome light emitters, such as mini-light emitting diodes (mini-LEDs) or micro-light emitting diodes (micro-LEDs). The light emitting diodes (LEDs) may include, for example, III-V semiconductor LEDs, organic LEDs (OLEDs), quantum dot LEDs (QLEDs), Quantum Dot Electro Luminescent (QDEL) devices, and Perovskite LEDs (PeLEDs). In some VR displays, light emitted by an array (e.g., a two-dimensional array) of light emitters may be projected by display optics to user's eyes, where the overall efficiency may be determined by the external quantum efficiency (EQE) of each light emitter and the efficiency of the display optics for directing the emitted light to the eyebox of a display system. In some AR displays, light emitted by an array of light emitters may be collimated and coupled into a combiner (e.g., a transparent waveguide) for delivering display images and ambient environment images to the user's eyes. The overall efficiency not of a waveguide display system for artificial reality applications may be determined by $\eta_{tot} = N_{EQE} \times \eta_{in} \times \eta_{out}$, where $\eta_{EQE}$ is the EQE of each light emitter, $\eta_{in}$ is the in-coupling efficiency of display light from the light emitters into the waveguide, and $\eta_{out}$ is the out-coupling efficiency of the display light from the waveguide towards the user's eye.

In general, only a fraction of the emitted light may reach the user's eyes due to, for example, the limited field of view and/or exit pupil of the display system.

Many light emitting devices, such as some semiconductor LEDs, OLEDs, QLEDs, QDEL devices, and PeLEDs, may have an angular emission profile close to the emission profile of a Lambertian emitter. This may reduce the coupling efficiency from the light emitting devices to the eyebox because some emitted light having large emission angles may not be collected and directed to the eyebox by the display optics. This may also cause ghost images due to, for example, stray light from the large emission angles. To improve the light efficiency and image quality of display systems, many display panels may be designed such that the emitted beam of each light emitting device is more directional. For example, a micro-lens array may be used in a display system to collimate the light beams emitted by the light emitting device such that each light beam may have small emission angles.

In addition, light emitted by the light emitting devices and collimated by the micro-lenses may not be uniformly collected and delivered to the eyebox of the display system by display optics (e.g., a pancake lens or another image projecting lens) that may have a limited aperture size and a limited field of view. For example, light emitted by light emitting devices near edges of the array of light emitting devices may be collected and delivered to the eyebox of the display system at lower efficiencies than light emitted by light emitting devices at the center of the array of light emitting devices, which may cause non-uniform intensity or brightness in the displayed images. Therefore, light emitted from light emitting devices at the edges of the array of light emitting devices may need to be deflected differently than light emitted from light emitting devices at the center of the array of light emitting devices. One technique to redirect the emitted light is using a micro-lens array that includes micro-lenses displaced from some light emitting devices. For example, the micro-lens array may have a pitch different from the pitch of the array of light emitting devices or may otherwise be center-offset with respect to the array of light emitting devices, such that the light beam emitted by each light emitting device may not only be collimated or focused, but may also be deflect by a respective deflection angle towards the display optics.

However, in many circumstances, for example, when the full-width half-magnitude (FWHM) angular ranges of light beams emitted from an array of micro-LEDs and extracted and deflected by an array of micro-lenses are large, and/or when the chief ray angle is large, deflecting the light beams emitted from the array of micro-LEDs by the array of micro-lenses at deflection angles matching the chief ray angles from the micro-LEDs may not achieve the highest coupling efficiency and intensity uniformity for the light beams.

According to certain embodiments, to improve the coupling efficiencies of light emitted by micro-LEDs of a micro-LED array and extracted and deflected by micro-lenses in a near-eye display, the displacements between micro-lenses and corresponding micro-LEDs may be selected based on the beam profiles of the light beams emitted by the micro-LEDs and extracted by the micro-lenses, and the positions of the micro-LEDs with respect to the display optics. The deflection angles of the light beams emitted by the micro-LEDs and extracted and deflected by the micro-lenses may not match (e.g., may be smaller than) the chief ray angles of the display optics for the micro-LEDs at different regions of the micro-LED array. For example, when the FWHM angular range of the light beam emitted by a micro-LED is large (e.g., greater than about 10° or) 20° and/or the chief ray angle of the display optics with respect to the micro-LED is large (e.g., equal to or greater than about 5° or) 10°, the corresponding micro-lens may be positioned such that it may deflect the light beam emitted from the micro-LED by a deflection angle that is smaller than the chief ray angle of the display optics with respect to the micro-LED. In some embodiments, the deflection angle may be between about 20% and about 80% of the chief ray angle. In some embodiments, the difference between the deflection angle and the chief ray angle may increase as the chief ray angle increases. In some embodiments, the difference between the deflection angle and the chief ray angle may increase as the FWHM angular range of the light beam increases.

The micro-LED devices described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). In some AR systems, the artificial images may be presented to users using an LED-based display subsystem.

As used herein, the term "micro-LED" or "μLED" may refer to an LED with a linear dimension less than about 200 μm, such as less than 100 μm, less than 50 μm, less than 20 μm, less than 10 μm, or smaller. For example, the linear dimension of a micro-LED may be as small as 6 μm, 5 μm, 4 μm, 2 μm, or smaller. As used herein, a micro-LED may include, for example, a semiconductor micro-LED (e.g., including III-V semiconductor materials) or an organic light emitting material-based micro-LED (e.g., micro-OLED). The disclosure herein is not limited to micro-LEDs, and may also be applied to mini-LEDs and large LEDs.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (μLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to determine the eye's orientation more accurately.

Figure 2:
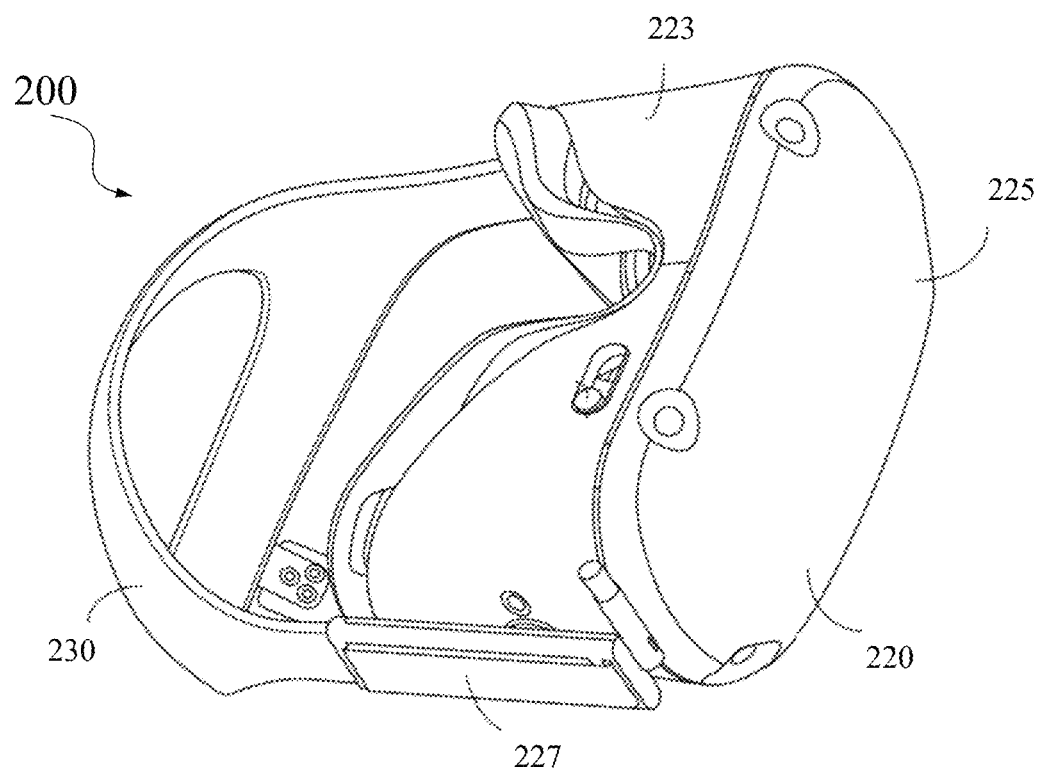
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
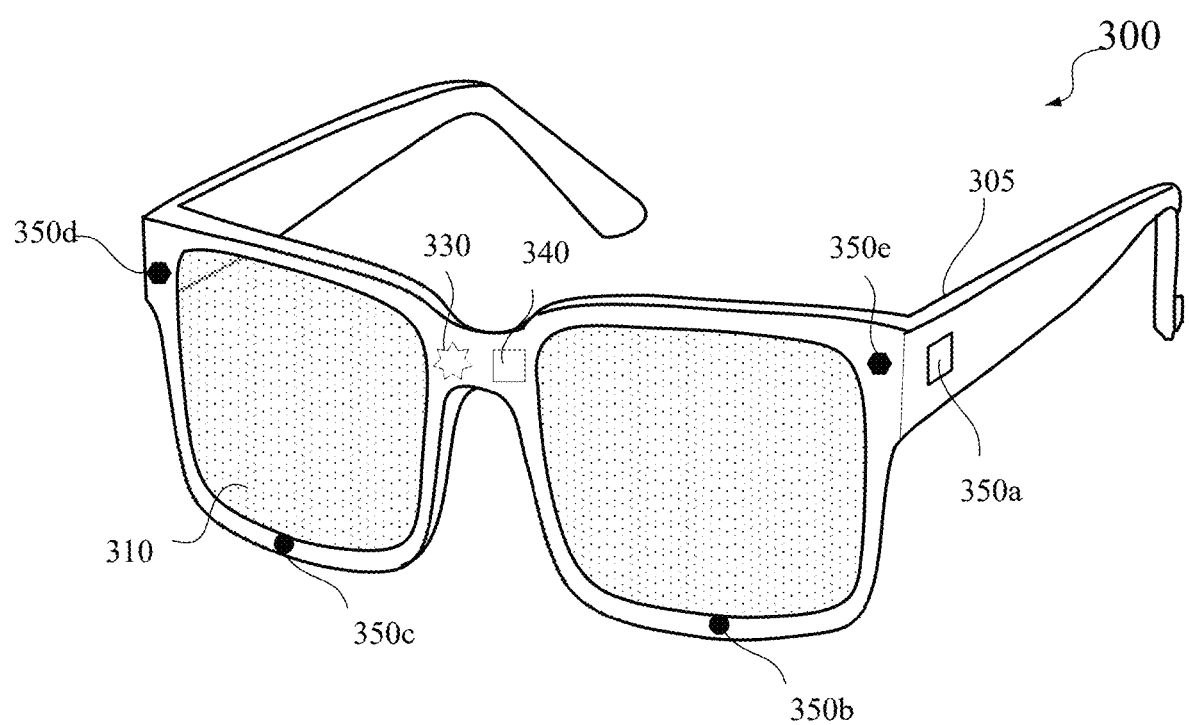
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
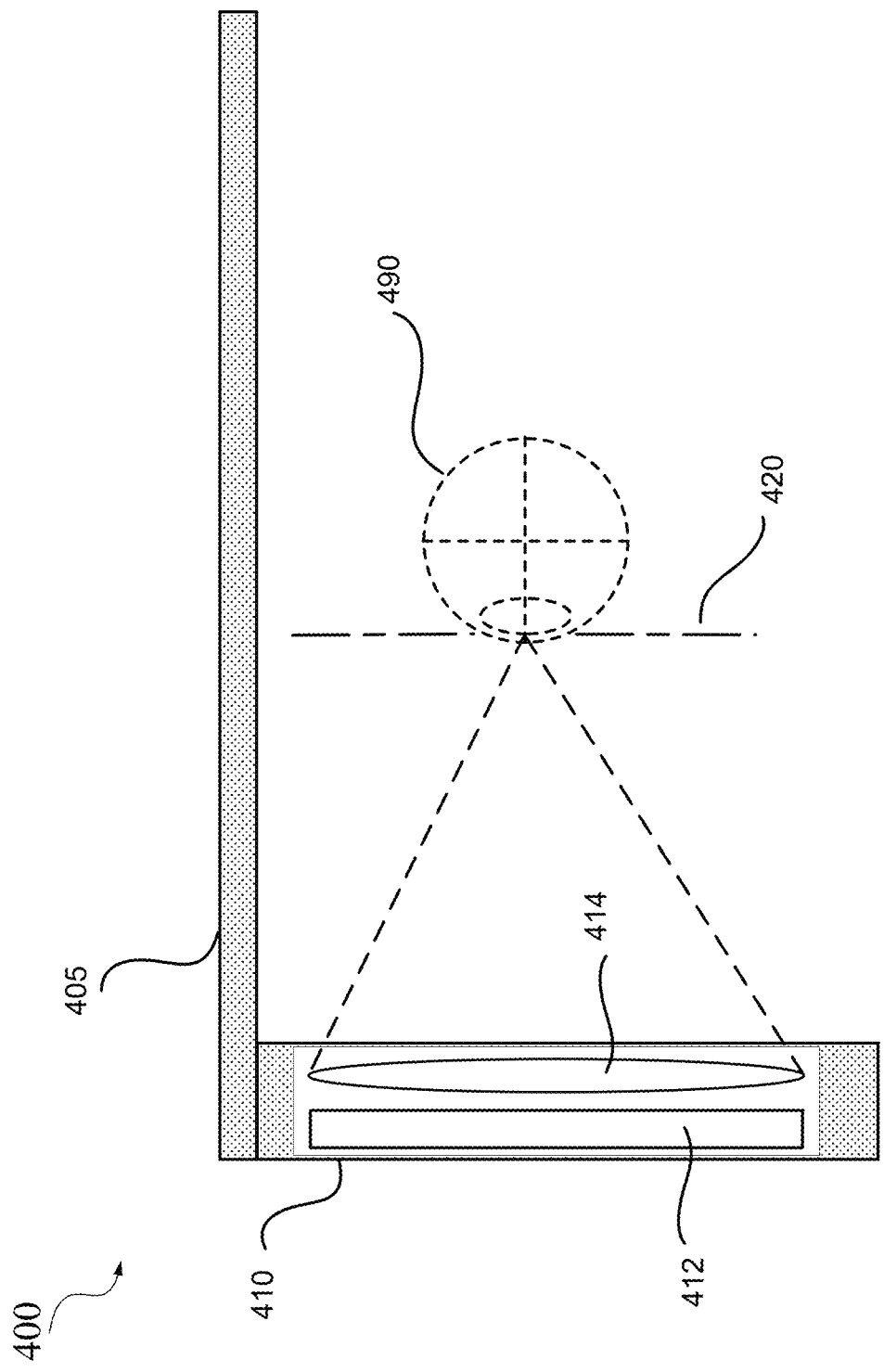
FIG. 4 is a cross-sectional view of an example of a near-eye display according to certain embodiments.

FIG. 4 is a cross-sectional view of an example of a near-eye display 400 according to certain embodiments. Near-eye display 400 may include at least one display assembly 410. Display assembly 410 may be configured to direct image light (e.g., display light) to an eyebox located at an exit pupil 420 and to user's eye 490. It is noted that, even though FIG. 4 and other figures in the present disclosure show an eye of a user of the near-eye display for illustration purposes, the eye of the user is not a part of the corresponding near-eye display.

As HMD device 200 and near-eye display 300, near-eye display 400 may include a frame 405 and display assembly 410 that may include a display 412 and/or display optics 414 coupled to or embedded in frame 405. As described above, display 412 may display images to the user electrically (e.g., using LCDs, LEDs, OLEDs) or optically (e.g., using a waveguide display and optical couplers) according to data received from a processing unit, such as console 110. In some embodiments, display 412 may include a display panel that includes pixels made of LCDs, LEDs, OLEDs, and the like. Display 412 may include sub-pixels to emit light of a predominant color, such as red, green, blue, white, or yellow. In some embodiments, display assembly 410 may include a stack of one or more waveguide displays including, but not restricted to, a stacked waveguide display, a varifocal waveguide display, and the like. The stacked waveguide display may be a polychromatic display (e.g., a red-green-blue (RGB) display) created by stacking waveguide displays whose respective monochromatic sources are of different colors.

Display optics 414 may be similar to display optics 124 and may display image content optically (e.g., using optical waveguides and optical couplers), correct optical errors associated with the image light, combine images of virtual objects and real objects, and present the corrected image light to exit pupil 420 of near-eye display 400, where the user's eye 490 may be located. In some embodiments, display optics 414 may also relay the images to create virtual images that appear to be away from display 412 and further than just a few centimeters away from the eyes of the user. For example, display optics 414 may collimate the image source to create a virtual image that may appear to be far away (e.g., greater than about 0.3 m, such as about 0.5 m, 1 m, or 3 m away) and convert spatial information of the displayed virtual objects into angular information. In some embodiments, display optics 414 may also magnify the source image to make the image appear larger than the actual size of the source image. More details of display 412 and display optics 414 are described below.

In various implementations, the optical system of a near-eye display, such as an HMD, may be pupil-forming or non-pupil-forming. Non-pupil-forming HMDs may not use intermediary optics to relay the displayed image, and thus the user's pupils may serve as the pupils of the HMD. Such non-pupil-forming displays may be variations of a magnifier (sometimes referred to as "simple eyepiece"), which may magnify a displayed image to form a virtual image at a greater distance from the eye. The non-pupil-forming display may use fewer optical elements. Pupil-forming HMDs may use optics similar to, for example, optics of a compound microscope or telescope, and may include some forms of projection optics that magnify an image and relay it to the exit pupil.

Figure 5:
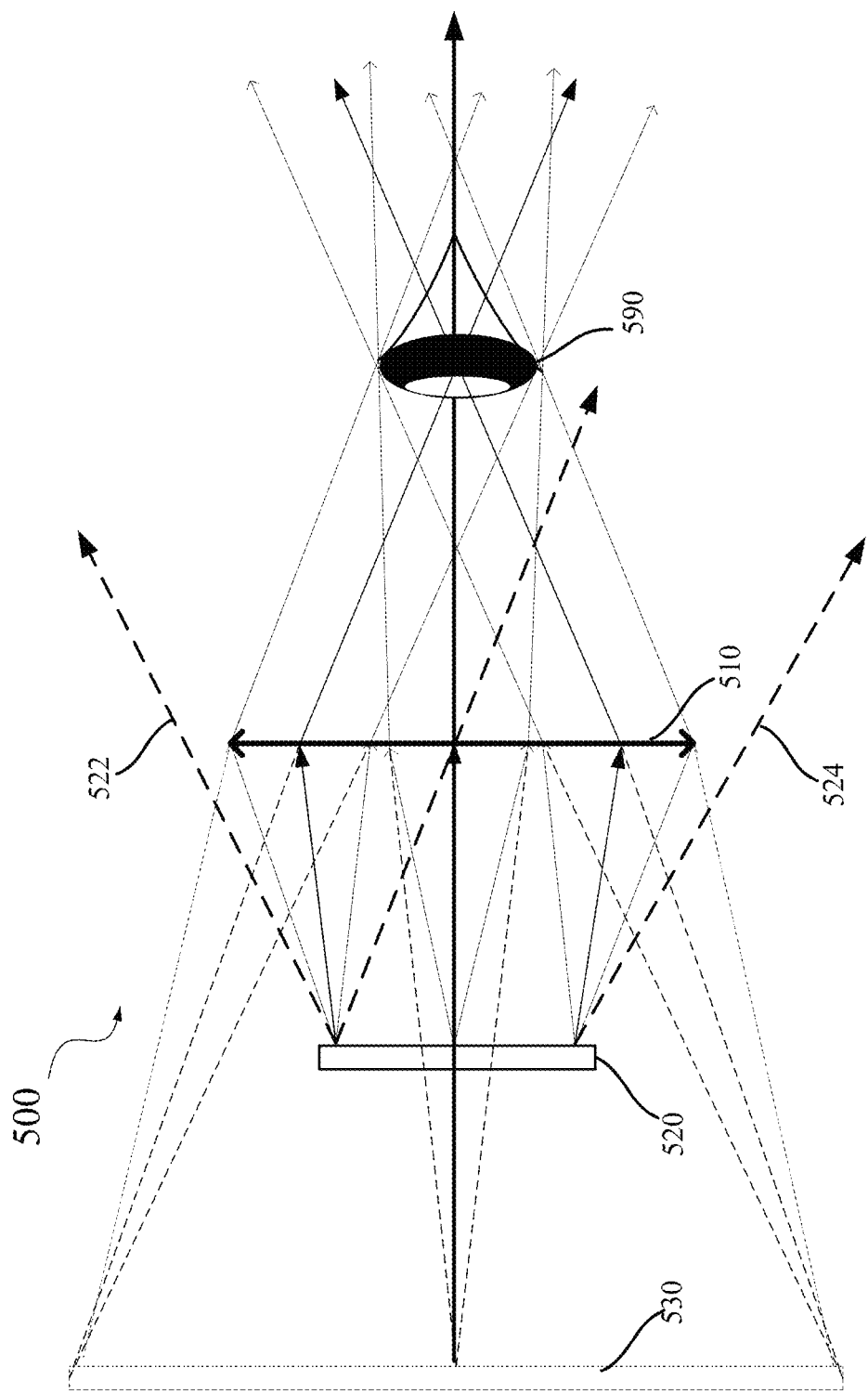
FIG. 5 illustrates an example of an optical system with a non-pupil forming configuration for a near-eye display device according to certain embodiments.

FIG. 5 illustrates an example of an optical system 500 with a non-pupil forming configuration for a near-eye display device according to certain embodiments. Optical system 500 may be an example of near-eye display 400, and may include display optics 510 and an image source 520 (e.g., a display panel). Display optics 510 may function as a magnifier. FIG. 5 shows that image source 520 is in front of display optics 510. In some other embodiments, image source 520 may be located outside of the field of view of the user's eye 590. For example, one or more deflectors or directional couplers may be used to deflect light from an image source to make the image source appear to be at the location of image source 520 shown in FIG. 5. Image source 520 may be an example of display 412 described above. For example, image source 520 may include a two-dimensional array of light emitters, such as semiconductor micro-LEDs or micro-OLEDs. The dimensions and pitches of the light emitters in image source 520 may be small. For example, each light emitter may have a diameter less than 2 µm (e.g., about 1.2 µm) and the pitch may be less than 2 µm (e.g., about 1.5 µm). As such, the number of light emitters in image source 520 can be equal to or greater than the number of pixels in a display image, such as 960×720, 1280×720, 1440×1080, 1920×1080, 2160×1080, or 2560×1080 pixels. Thus, a display image may be generated simultaneously by image source 520.

Light from an area (e.g., a pixel or a light emitter) of image source 520 may be directed to a user's eye 590 by display optics 510. Light directed by display optics 510 may form virtual images on an image plane 530. The location of image plane 530 may be determined based on the location of image source 520 and the focal length of display optics 510. A user's eye 590 may form a real image on the retina of user's eye 590 using light directed by display optics 510. In this way, objects at different spatial locations on image source 520 may appear to be objects on an image plane far away from user's eye 590 at different viewing angles. Image source 520 may have a size larger or smaller than the size (e.g., aperture) of display optics 510. Some light emitted from image source 520 with large emission angles (as shown by light rays 522 and 524) may not be collected and directed to user's eye 590 by display optics 510, and may become stray light.

Figure 6A:
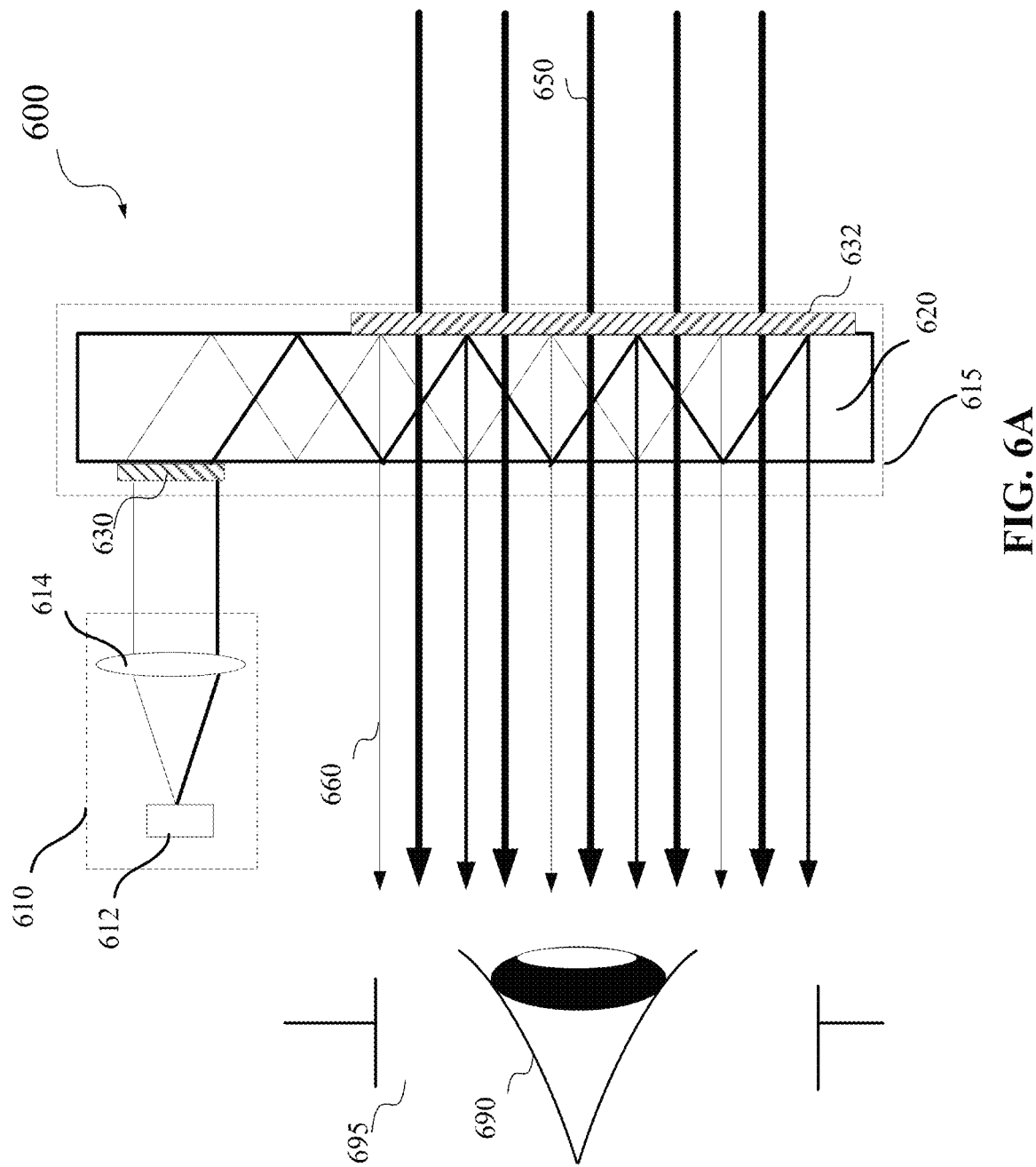
FIG. 6A illustrates an example of an optical see-through augmented reality system including a waveguide display according to certain embodiments.

FIG. 6A illustrates an example of an optical see-through augmented reality system 600 including a waveguide display according to certain embodiments. Augmented reality system 600 may be another example of near-eye display 400, and may include a projector 610 and a combiner 615. Projector 610 may include a light source or image source 612 and projector optics 614. In some embodiments, image source 612 may include a plurality of pixels that displays virtual objects, such as an LCD display panel or an LED display panel. For example, in some embodiments, light source or image source 612 may include one or more micro-LED devices, such as micro-OLED devices or semiconductor micro-LED devices. In some embodiments, image source 612 may include a plurality of light sources (e.g., a two-dimensional array of micro-LEDs), each emitting a monochromatic image light corresponding to a primary color (e.g., red, green, or blue). In some embodiments, image source 612 may include three two-dimensional arrays of micro-LEDs, where each two-dimensional array of micro-LEDs may include micro-LEDs configured to emit light of a primary color (e.g., red, green, or blue). In some embodiments, image source 612 may include a coherent or partially coherent light source (e.g., a laser) and an optical pattern generator, such as a spatial light modulator.

Projector optics 614 may include one or more optical components that can condition the light from image source 612, such as expanding, collimating, scanning, or projecting light from image source 612 to combiner 615. The one or more optical components may include, for example, one or more solid lenses, liquid lenses, mirrors, apertures, and/or gratings. In some embodiments, image source 612 may include one or more two-dimensional arrays of micro-LEDs, and projector optics 614 may include a lens assembly. In some embodiments, image source 612 may include one or more one-dimensional arrays or elongated two-dimensional arrays of micro-LEDs, and projector optics 614 may include one or more one-dimensional scanners (e.g., micro-mirrors or prisms) configured to scan light emitted by the one-dimensional arrays or elongated two-dimensional arrays of micro-LEDs to generate image frames. In some embodiments, projector optics 614 may include a liquid lens (e.g., a liquid crystal lens) with a plurality of electrodes that allows scanning of light from image source 612.

Combiner 615 may include an input coupler 630 for coupling light from projector 610 into a substrate 620 of combiner 615. Input coupler 630 may include, for example, a diffractive optical element (DOE) (e.g., a volume holographic grating, a surface-relief grating, a Pancharatnam-Berry phase (PBP) grating, or a polarization volume hologram (PVH) grating), a slanted surface of substrate 620, or a refractive coupler (e.g., a wedge or a prism). For example, input coupler 630 may include a transmissive volume Bragg grating (e.g., on a surface of substrate 620 facing projector 610) or a reflective volume Bragg grating (e.g., on a surface of substrate 620 opposing projector 610). Input coupler 630 may have a coupling efficiency of greater than 30%, 50%, 75%, 90%, or higher for visible light. Light coupled into substrate 620 may propagate within substrate 620 through, for example, total internal reflection (TIR). In some embodiments, substrate 620 may be in the form of a lens of a pair of eyeglasses. Substrate 620 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 620 may be transparent to visible light.

Substrate 620 may include or may be coupled to a plurality of output couplers 632. Each output coupler 632 may be configured to extract at least a portion of the light guided by and propagating within substrate 620 out of substrate 620, and direct the extracted light 660 towards an eyebox 695 where an eye 690 of the user of augmented reality system 600 may be located when augmented reality system 600 is in use. The plurality of output couplers 632 may replicate the exit pupil to increase the size of eyebox 695 such that the displayed image may be visible in a larger area. As input coupler 630, output couplers 632 may include grating couplers (e.g., volume holographic gratings or surface-relief gratings), other diffraction optical elements (DOEs), prisms, partial reflectors (e.g., transflective mirrors), and the like. For example, output couplers 632 may include reflective volume Bragg gratings, transmissive volume Bragg gratings, or PVHs. Output couplers 632 may have different coupling (e.g., diffraction) efficiencies at different locations such that the intensities of the light beams coupled out of substrate 620 at different locations may be about the same. Substrate 620 and output couplers 632 may also allow light 650 from the environment in front of combiner 615 to pass through with little or no loss. For example, in some implementations, output couplers 632 may have a very low diffraction efficiency for light 650 such that light 650 may be refracted or otherwise pass through output couplers 632 with little loss, and may have a higher intensity than extracted light 660. As a result, the user may be able to view combined images of the environment in front of combiner 615 and images of virtual objects projected by projector 610.

Figure 6C:
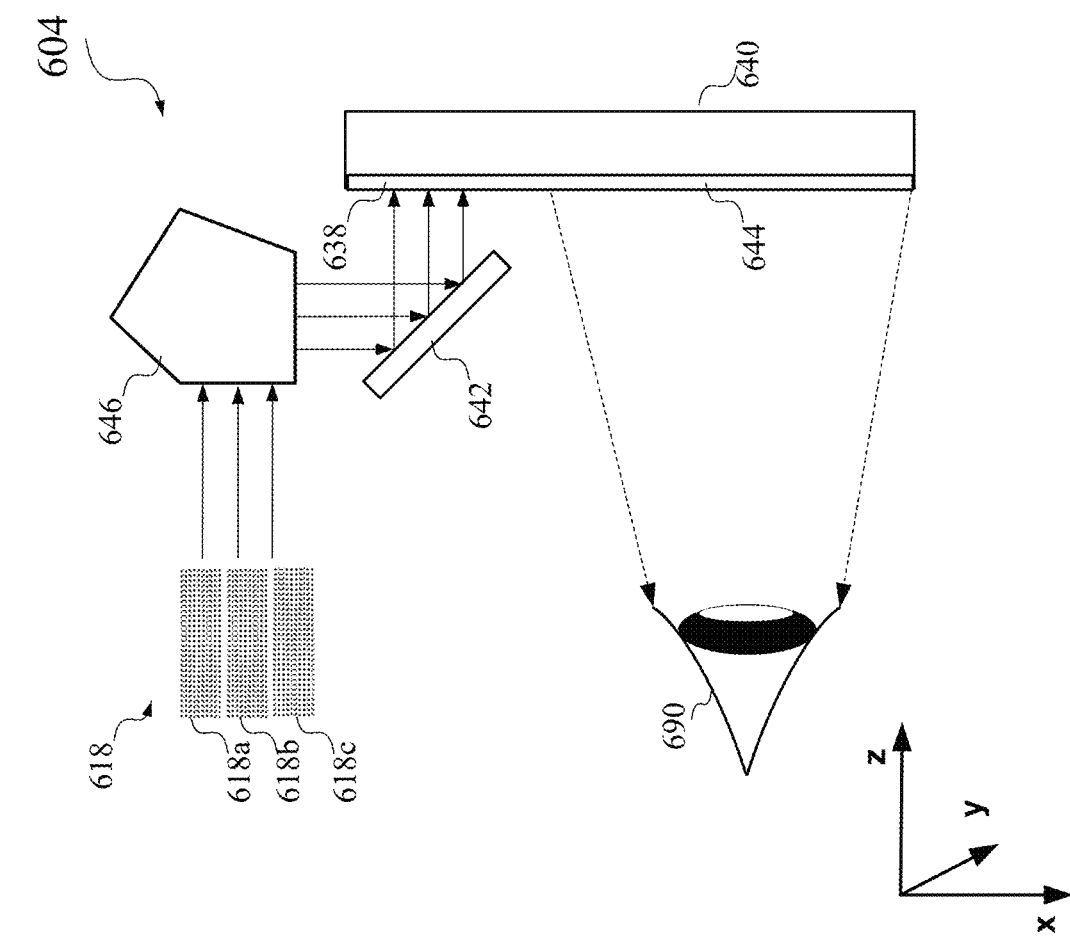
FIG. 6C illustrates an example of a near-eye display device including a waveguide display according to certain embodiments.
Figure 6B:
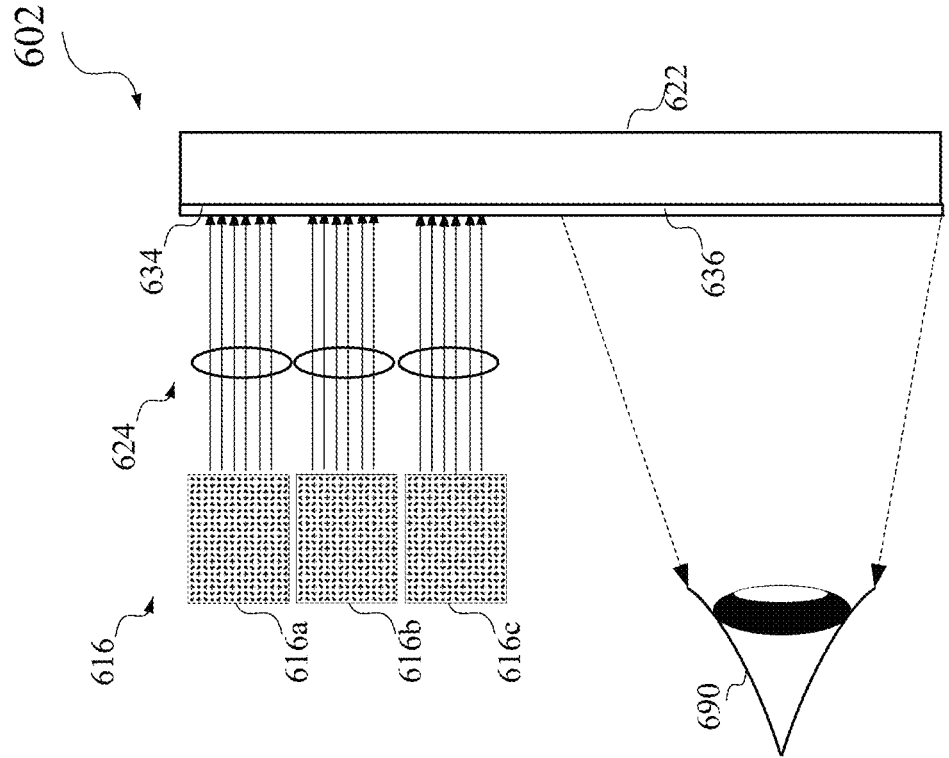
FIG. 6B illustrates an example of a near-eye display device including a waveguide display according to certain embodiments.

FIG. 6B illustrates an example of a near-eye display (NED) device 602 including a waveguide display 622 according to certain embodiments. NED device 602 may be an example of augmented reality system 600. NED device 602 may include light source 616, projection optics 624, and waveguide display 622. Light source 616 may include multiple panels of light emitters for different colors, such as a panel of red light emitters 616a, a panel of green light emitters 616b, and a panel of blue light emitters 616c. The red light emitters 616a are organized into an array; the green light emitters 616b are organized into an array; and the blue light emitters 616c are organized into an array. The dimensions and pitches of light emitters in light source 616 may be small. For example, each light emitter may have a diameter less than 2 µm (e.g., about 1.2 µm) and the pitch may be less than 2 µm (e.g., about 1.5 µm). As such, the number of light emitters in each red light emitters 616a, green light emitters 616b, and blue light emitters 616c can be equal to or greater than the number of pixels in a display image, such as 960×720, 1280×720, 1440×1080, 1920×1080, 2160×1080, or 2560×1080 pixels. Thus, a display image may be generated simultaneously by light source 616. A scanning element may not be used in NED device 602.

Before reaching waveguide display 622, the light emitted by light source 616 may be conditioned by projection optics 624, which may include a lens array. Projection optics 624 may collimate or focus the light emitted by light source 616 to waveguide display 622, which may include a coupler 634 for coupling the light emitted by light source 616 into waveguide display 622. The light coupled into waveguide display 622 may propagate within waveguide display 622 through, for example, total internal reflection as described above with respect to FIG. 6A. A coupler 636 may couple portions of the light propagating within waveguide display 622 out of waveguide display 622 and towards user's eye 690.

FIG. 6C illustrates another example of a near-eye display (NED) device 604 including a waveguide display 640 according to certain embodiments. In some embodiments, NED device 604 may use a scanning mirror 642 to project light from a light source 618 to an image field where a user's eye 690 may be located. NED device 604 may be an example of augmented reality system 600. Light source 618 may include one or more rows or one or more columns of light emitters of different colors, such as multiple rows of red light emitters 618a, multiple rows of green light emitters 618b, and multiple rows of blue light emitters 618c. For example, red light emitters 618a, green light emitters 618b, and blue light emitters 618c may each include N rows, each row including, for example, 2560 light emitters (pixels). The red light emitters 618a are organized into an array; the green light emitters 618b are organized into an array; and the blue light emitters 618c are organized into an array. In some embodiments, light source 618 may include a single line of light emitters for each color. In some embodiments, light source 618 may include multiple columns of light emitters for each of red, green, and blue colors, where each column may include, for example, 1080 light emitters. In some embodiments, the dimensions and/or pitches of the light emitters in light source 618 may be relatively large (e.g., about 3-6 µm) and thus light source 618 may not include sufficient light emitters for simultaneously generating a full display image. For example, the number of light emitters for a single color may be fewer than the number of pixels (e.g., 2560×1080 pixels) in a display image. The light emitted by light source 618 may be a set of collimated or diverging beams of light.

Before reaching scanning mirror 642, the light emitted by light source 618 may be conditioned by various optical devices, such as collimating lenses or a freeform optical element 646. Freeform optical element 646 may include, for example, a multi-facet prism or another light folding element that may direct the light emitted by light source 618 towards scanning mirror 642, such as changing the propagation direction of the light emitted by light source 618 by, for example, about 90° or larger. In some embodiments, freeform optical element 646 may be rotatable to scan the light. Scanning mirror 642 and/or freeform optical element 646 may reflect and project the light emitted by light source 618 to waveguide display 640, which may include a coupler 638 for coupling the light emitted by light source 618 into waveguide display 640. The light coupled into waveguide display 640 may propagate within waveguide display 640 through, for example, total internal reflection as described above with respect to FIG. 6A. A coupler 644 may couple portions of the light propagating within waveguide display 640 out of waveguide display 640 and towards user's eye 690.

Scanning mirror 642 may include a microelectromechanical system (MEMS) mirror or any other suitable mirrors. Scanning mirror 642 may rotate to scan in one or two dimensions. As scanning mirror 642 rotates, the light emitted by light source 618 may be directed to a different area of waveguide display 640 such that a full display image may be projected onto waveguide display 640 and directed to user's eye 690 by waveguide display 640 in each scanning cycle. For example, in embodiments where light source 618 includes light emitters for all pixels in one or more rows or columns, scanning mirror 642 may be rotated in the column or row direction (e.g., x or y direction) to scan an image. In embodiments where light source 618 includes light emitters for some but not all pixels in one or more rows or columns, scanning mirror 642 may be rotated in both the row and column directions (e.g., both x and y directions) to project a display image (e.g., using a raster-type scanning pattern).

NED device 604 may operate in predefined display periods. A display period (e.g., display cycle) may refer to a duration of time in which a full image is scanned or projected. For example, a display period may be a reciprocal of the desired frame rate. In NED device 604 that includes scanning mirror 642, the display period may also be referred to as a scanning period or scanning cycle. The light generation by light source 618 may be synchronized with the rotation of scanning mirror 642. For example, each scanning cycle may include multiple scanning steps, where light source 618 may generate a different light pattern in each respective scanning step.

In each scanning cycle, as scanning mirror 642 rotates, a display image may be projected onto waveguide display 640 and user's eye 690. The actual color value and light intensity (e.g., brightness) of a given pixel location of the display image may be an average of the light beams of the three colors (e.g., red, green, and blue) illuminating the pixel location during the scanning period. After completing a scanning period, scanning mirror 642 may revert back to the initial position to project light for the first few rows of the next display image or may rotate in a reverse direction or scan pattern to project light for the next display image, where a new set of driving signals may be fed to light source 618. The same process may be repeated as scanning mirror 642 rotates in each scanning cycle. As such, different images may be projected to user's eye 690 in different scanning cycles.

Figure 7:
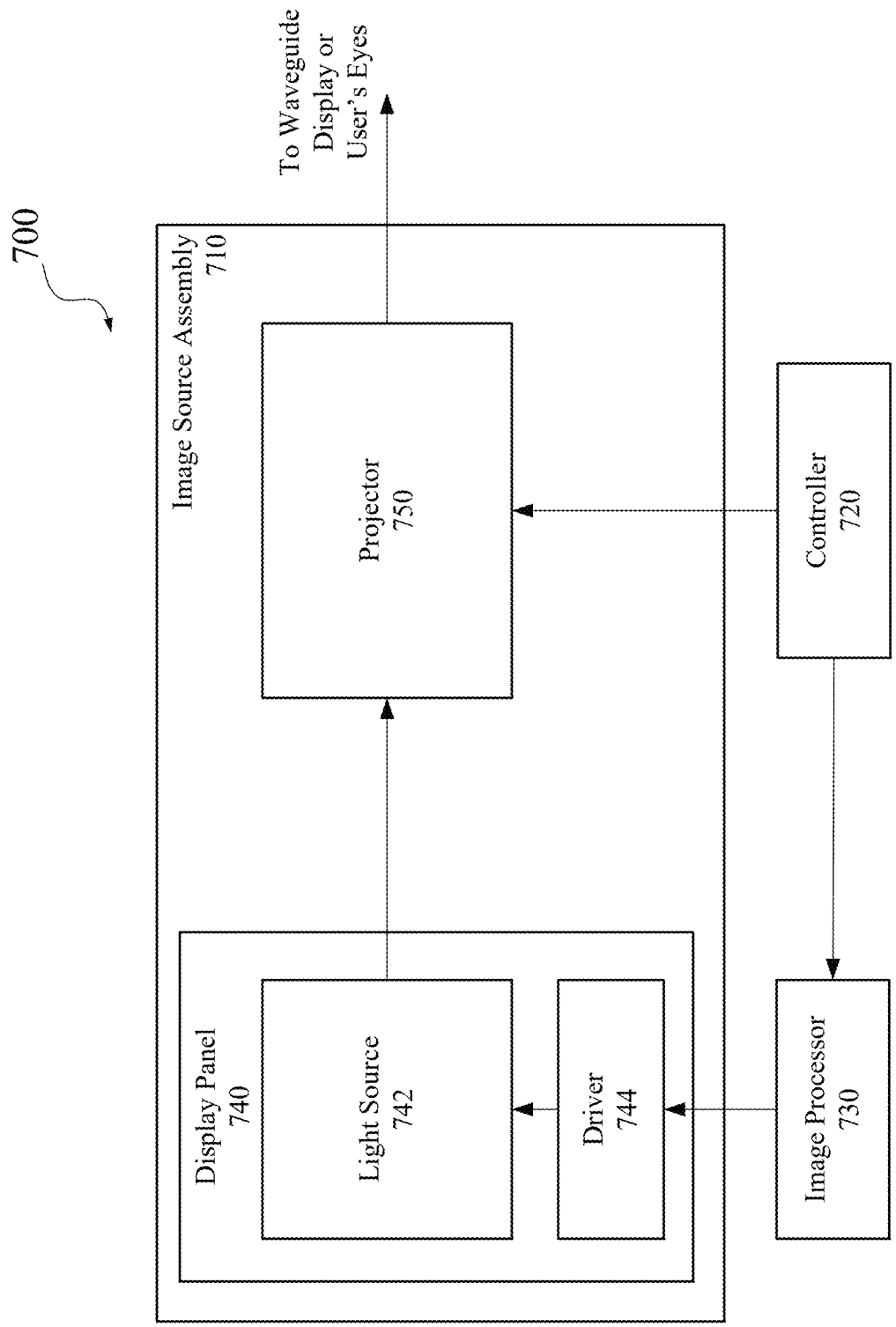
FIG. 7 illustrates an example of an image source assembly in an augmented reality system according to certain embodiments.

FIG. 7 illustrates an example of an image source assembly 710 in a near-eye display system 700 according to certain embodiments. Image source assembly 710 may include, for example, a display panel 740 that may generate display images to be projected to the user's eyes, and a projector 750 that may project the display images generated by display panel 740 to user's eyes directly, or through display optics or a waveguide display as described above with respect to FIGS. 4-6C. Display panel 740 may include a light source 742 and a drive circuit 744 for light source 742. Light source 742 may include, for example, display 412, image source 520, image source 612, light source 616, or light source 618. Projector 750 may include, for example, display optics 414, display optics 510, projector optics 614, freeform optical element 646, and scanning mirror 642, described above. Near-eye display system 700 may also include a controller 720 that synchronously controls light source 742 and projector 750 (e.g., scanning mirror 642). Image source assembly 710 may generate and output an image light to a waveguide display (not shown in FIG. 7), such as the waveguide displays shown in FIGS. 6A-6C. As described above, the waveguide display may receive the image light at one or more input-coupling elements, and guide the received image light to one or more output-coupling elements. The input and output coupling elements may include, for example, a diffraction grating, a holographic grating, a prism, or any combination thereof. The input-coupling element may be chosen such that total internal reflection occurs with the waveguide display. The output-coupling element may couple portions of the total internally reflected image light out of the waveguide display.

As described above, light source 742 may include a plurality of light emitters arranged in an array or a matrix. Each light emitter may emit monochromatic light, such as red light, blue light, green light, infra-red light, and the like. While RGB colors are often discussed in this disclosure, embodiments described herein are not limited to using red, green, and blue as primary colors. Other colors can also be used as the primary colors of near-eye display system 700. In some embodiments, a display panel in accordance with an embodiment may use more than three primary colors. Each pixel in light source 742 may include three subpixels that include a red micro-LED, a green micro-LED, and a blue micro-LED. A semiconductor LED generally includes an active light emitting layer within multiple layers of semiconductor materials. The multiple layers of semiconductor materials may include different compound materials or a same base material with different dopants and/or different doping densities. For example, the multiple layers of semiconductor materials may include an n-type material layer, an active region that may include hetero-structures (e.g., one or more quantum wells), and a p-type material layer. The multiple layers of semiconductor materials may be grown on a surface of a substrate having a certain orientation. In some embodiments, to increase light extraction efficiency, a mesa that includes at least some of the layers of semiconductor materials may be formed.

Controller 720 may control the image rendering operations of image source assembly 710, such as the operations of light source 742 and/or projector 750. For example, controller 720 may determine instructions for image source assembly 710 to render one or more display images. The instructions may include display instructions and scanning instructions. In some embodiments, the display instructions may include an image file (e.g., a bitmap file). The display instructions may be received from, for example, a console, such as console 110 described above with respect to FIG. 1. The scanning instructions may be used by image source assembly 710 to generate image light. The scanning instructions may specify, for example, a type of a source of image light (e.g., monochromatic or polychromatic), a scanning rate, an orientation of a scanning apparatus, one or more illumination parameters, or any combination thereof. Controller 720 may include a combination of hardware, software, and/or firmware not shown here so as not to obscure other aspects of the present disclosure.

In some embodiments, controller 720 may be a graphics processing unit (GPU) of a display device. In other embodiments, controller 720 may be other kinds of processors. The operations performed by controller 720 may include taking content for display and dividing the content into discrete sections. Controller 720 may provide to light source 742 scanning instructions that include an address corresponding to an individual source element of light source 742 and/or an electrical bias applied to the individual source element. Controller 720 may instruct light source 742 to sequentially present the discrete sections using light emitters corresponding to one or more rows of pixels in an image ultimately displayed to the user. Controller 720 may also instruct projector 750 to perform different adjustments of the light. For example, controller 720 may control projector 750 to scan the discrete sections to different areas of a coupling element of the waveguide display (e.g., waveguide display 622) as described above with respect to FIG. 6C. As such, at the exit pupil of the waveguide display, each discrete portion is presented in a different respective location. While each discrete section is presented at a different respective time, the presentation and scanning of the discrete sections occur fast enough such that a user's eye may integrate the different sections into a single image or series of images.

Image processor 730 may be a general-purpose processor and/or one or more application-specific circuits that are dedicated to performing the features described herein. In one embodiment, a general-purpose processor may be coupled to a memory to execute software instructions that cause the processor to perform certain processes described herein. In another embodiment, image processor 730 may be one or more circuits that are dedicated to performing certain features. While image processor 730 in FIG. 7 is shown as a stand-alone unit that is separate from controller 720 and drive circuit 744, image processor 730 may be a sub-unit of controller 720 or drive circuit 744 in other embodiments. In other words, in those embodiments, controller 720 or drive circuit 744 may perform various image processing functions of image processor 730. Image processor 730 may also be referred to as an image processing circuit.

In the example shown in FIG. 7, light source 742 may be driven by drive circuit 744, based on data or instructions (e.g., display and scanning instructions) sent from controller 720 or image processor 730. In one embodiment, drive circuit 744 may include a circuit panel that connects to and mechanically holds various light emitters of light source 742. Light source 742 may emit light in accordance with one or more illumination parameters that are set by the controller 720 and potentially adjusted by image processor 730 and drive circuit 744. An illumination parameter may be used by light source 742 to generate light. An illumination parameter may include, for example, source wavelength, pulse rate, pulse amplitude, beam type (continuous or pulsed), other parameter(s) that may affect the emitted light, or any combination thereof. In some embodiments, the source light generated by light source 742 may include multiple beams of red light, green light, and blue light, or any combination thereof.

Projector 750 may perform a set of optical functions, such as focusing, combining, conditioning, or scanning the image light generated by light source 742. In some embodiments, projector 750 may include a combining assembly, a light conditioning assembly, or a scanning mirror assembly. Projector 750 may include one or more optical components that optically adjust and potentially re-direct the light from light source 742. One example of the adjustment of light may include conditioning the light, such as expanding, collimating, correcting for one or more optical errors (e.g., field curvature, chromatic aberration, etc.), some other adjustments of the light, or any combination thereof. The optical components of projector 750 may include, for example, lenses, mirrors, apertures, gratings, or any combination thereof.

Projector 750 may redirect image light via its one or more reflective and/or refractive portions so that the image light is projected at certain orientations toward the waveguide display. The location where the image light is redirected toward the waveguide display may depend on specific orientations of the one or more reflective and/or refractive portions. In some embodiments, projector 750 includes a single scanning mirror that scans in at least two dimensions. In other embodiments, projector 750 may include a plurality of scanning mirrors that each scan in directions orthogonal to each other. Projector 750 may perform a raster scan (horizontally or vertically), a bi-resonant scan, or any combination thereof. In some embodiments, projector 750 may perform a controlled vibration along the horizontal and/or vertical directions with a specific frequency of oscillation to scan along two dimensions and generate a two-dimensional projected image of the media presented to user's eyes. In other embodiments, projector 750 may include a lens or prism that may serve similar or the same function as one or more scanning mirrors. In some embodiments, image source assembly 710 may not include a projector, where the light emitted by light source 742 may be directly incident on the waveguide display.

Figure 8A:
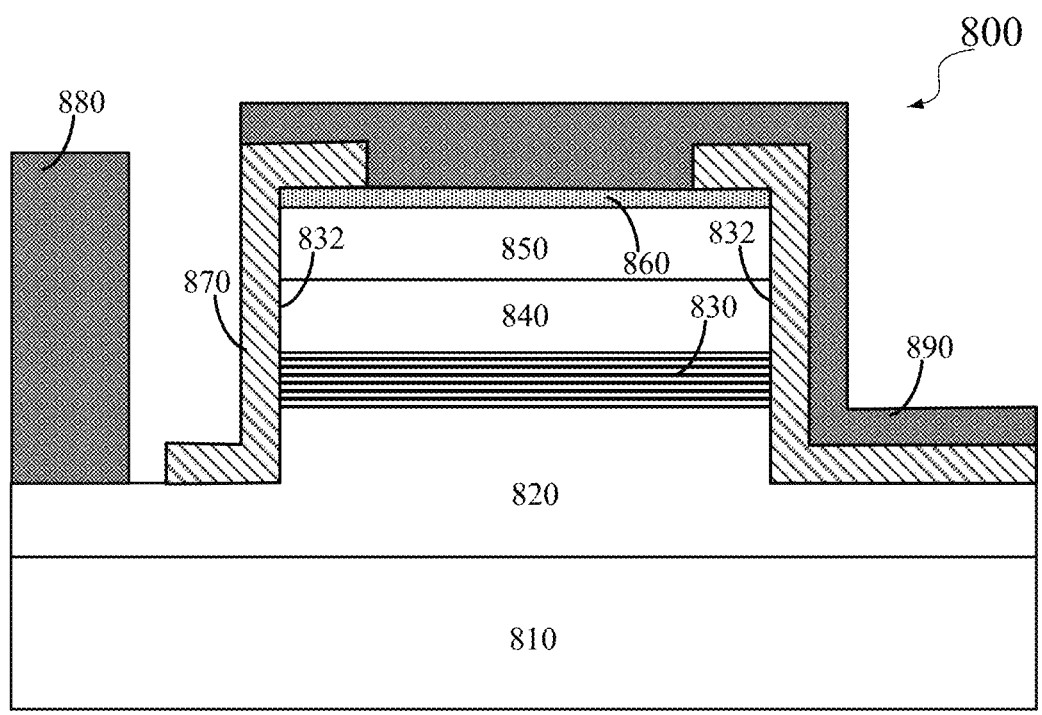
FIG. 8A illustrates an example of a light emitting diode (LED) having a vertical mesa structure according to certain embodiments.

FIG. 8A illustrates an example of an LED 800 having a vertical mesa structure. LED 800 may be a light emitter in image source 612, or light source 616, 618, or 742. LED 800 may be a micro-LED made of inorganic materials, such as multiple layers of semiconductor materials. The layered semiconductor light emitting device may include multiple layers of III-V semiconductor materials. A III-V semiconductor material may include one or more Group III elements, such as aluminum (Al), gallium (Ga), or indium (In), in combination with a Group V element, such as nitrogen (N), phosphorus (P), arsenic (As), or antimony (Sb). When the Group V element of the III-V semiconductor material includes nitrogen, the III-V semiconductor material is referred to as a III-nitride material. The layered semiconductor light emitting device may be manufactured by growing multiple epitaxial layers on a substrate using techniques such as vapor-phase epitaxy (VPE), liquid-phase epitaxy (LPE), molecular beam epitaxy (MBE), or metalorganic chemical vapor deposition (MOCVD). For example, the layers of the semiconductor materials may be grown layer-by-layer on a substrate with a certain crystal lattice orientation (e.g., polar, nonpolar, or semi-polar orientation), such as a GaN, GaAs, or GaP substrate, or a substrate including, but not limited to, sapphire, silicon carbide, silicon, zinc oxide, boron nitride, lithium aluminate, lithium niobate, germanium, aluminum nitride, lithium gallate, partially substituted spinels, or quaternary tetragonal oxides sharing the beta-LiAlO$_2$ structure, where the substrate may be cut in a specific direction to expose a specific plane as the growth surface.

In the example shown in FIG. 8A, LED 800 may include a substrate 810, which may include, for example, a sapphire substrate or a GaN substrate. A semiconductor layer 820 may be grown on substrate 810. Semiconductor layer 820 may include a III-V material, such as GaN, and may be p-doped (e.g., with Mg, Ca, Zn, or Be) or n-doped (e.g., with Si or Ge). One or more active layers 830 may be grown on semiconductor layer 820 to form an active region. Active layer 830 may include III-V materials, such as one or more InGaN layers, one or more AlInGaP layers, and/or one or more GaN layers, which may form one or more heterostructures, such as one or more quantum wells or multi-quantum wells (MQWs). A semiconductor layer 840 may be grown on active layer 830. Semiconductor layer 840 may include a III-V material, such as GaN, and may be p-doped (e.g., with Mg, Ca, Zn, or Be) or n-doped (e.g., with Si or Ge). One of semiconductor layer 820 and semiconductor layer 840 may be a p-type layer and the other one may be an n-type layer. Semiconductor layer 820 and semiconductor layer 840 sandwich active layer 830 to form the light emitting region. For example, LED 800 may include a layer of InGaN situated between a layer of p-type GaN doped with magnesium and a layer of n-type GaN doped with silicon or oxygen. In some embodiments, LED 800 may include a layer of AlInGaP situated between a layer of p-type AlInGaP doped with zinc or magnesium and a layer of n-type AlInGaP doped with selenium, silicon, or tellurium.

In some embodiments, an electron-blocking layer (EBL) (not shown in FIG. 8A) may be grown to form a layer between active layer 830 and at least one of semiconductor layer 820 or semiconductor layer 840. The EBL may reduce the electron leakage current and improve the efficiency of the LED. In some embodiments, a heavily-doped semiconductor layer 850, such as a $P^+$ or $P^{++}$ semiconductor layer, may be formed on semiconductor layer 840 and act as a contact layer for forming an ohmic contact and reducing the contact impedance of the device. In some embodiments, a conductive layer 860 may be formed on heavily-doped semiconductor layer 850. Conductive layer 860 may include, for example, an indium tin oxide (ITO) or Al/Ni/Au film. In one example, conductive layer 860 may include a transparent ITO layer.

To make contact with semiconductor layer 820 (e.g., an n-GaN layer) and to more efficiently extract light emitted by active layer 830 from LED 800, the semiconductor material layers (including heavily-doped semiconductor layer 850, semiconductor layer 840, active layer 830, and semiconductor layer 820) may be etched to expose semiconductor layer 820 and to form a mesa structure that includes layers 820-860. The mesa structure may confine the carriers within the device. Etching the mesa structure may lead to the formation of mesa sidewalls 832 that may be orthogonal to the growth planes. A passivation layer 870 may be formed on mesa sidewalls 832 of the mesa structure. Passivation layer 870 may include an oxide layer, such as a $SiO_2$ layer, and may act as a reflector to reflect emitted light out of LED 800. A contact layer 880, which may include a metal layer, such as Al, Au, Ni, Ti, or any combination thereof, may be formed on semiconductor layer 820 and may act as an electrode of LED 800. In addition, another contact layer 890, such as an Al/Ni/Au metal layer, may be formed on conductive layer 860 and may act as another electrode of LED 800.

When a voltage signal is applied to contact layers 880 and 890, electrons and holes may recombine in active layer 830, where the recombination of electrons and holes may cause photon emission. The wavelength and energy of the emitted photons may depend on the energy bandgap between the valence band and the conduction band in active layer 830. For example, InGaN active layers may emit green or blue light, AlGaN active layers may emit blue to ultraviolet light, while AlInGaP active layers may emit red, orange, yellow, or green light. The emitted photons may be reflected by passivation layer 870 and may exit LED 800 from the top (e.g., conductive layer 860 and contact layer 890) or bottom (e.g., substrate 810).

In some embodiments, LED 800 may include one or more other components, such as a lens, on the light emission surface, such as substrate 810, to focus or collimate the emitted light or couple the emitted light into a waveguide. In some embodiments, an LED may include a mesa of another shape, such as planar, conical, semi-parabolic, or parabolic, and a base area of the mesa may be circular, rectangular, hexagonal, or triangular. For example, the LED may include a mesa of a curved shape (e.g., paraboloid shape) and/or a non-curved shape (e.g., conic shape). The mesa may be truncated or non-truncated.

Figure 8B:
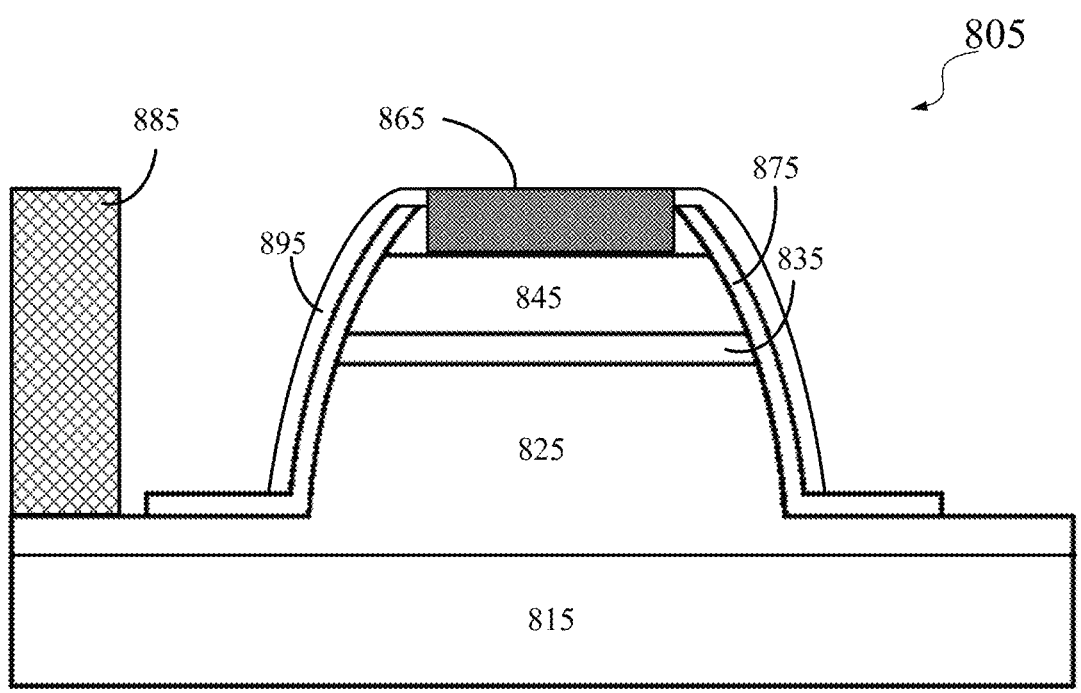
FIG. 8B is a cross-sectional view of an example of an LED having a parabolic mesa structure according to certain embodiments.

FIG. 8B is a cross-sectional view of an example of an LED 805 having a parabolic mesa structure. Similar to LED 800, LED 805 may include multiple layers of semiconductor materials, such as multiple layers of III-V semiconductor materials. The semiconductor material layers may be epitaxially grown on a substrate 815, such as a GaN substrate or a sapphire substrate. For example, a semiconductor layer 825 may be grown on substrate 815. Semiconductor layer 825 may include a III-V material, such as GaN, and may be p-doped (e.g., with Mg, Ca, Zn, or Be) or n-doped (e.g., with Si or Ge). One or more active layer 835 may be grown on semiconductor layer 825. Active layer 835 may include III-V materials, such as one or more InGaN layers, one or more AlInGaP layers, and/or one or more GaN layers, which may form one or more heterostructures, such as one or more quantum wells. A semiconductor layer 845 may be grown on active layer 835. Semiconductor layer 845 may include a III-V material, such as GaN, and may be p-doped (e.g., with Mg, Ca, Zn, or Be) or n-doped (e.g., with Si or Ge). One of semiconductor layer 825 and semiconductor layer 845 may be a p-type layer and the other one may be an n-type layer.

To make contact with semiconductor layer 825 (e.g., an n-type GaN layer) and to more efficiently extract light emitted by active layer 835 from LED 805, the semiconductor layers may be etched to expose semiconductor layer 825 and to form a mesa structure that includes layers 825-845. The mesa structure may confine carriers within the injection area of the device. Etching the mesa structure may lead to the formation of mesa side walls (also referred to herein as facets) that may be non-parallel with, or in some cases, orthogonal, to the growth planes associated with crystalline growth of layers 825-845.

As shown in FIG. 8B, LED 805 may have a mesa structure that includes a flat top. A dielectric layer 875 (e.g., $SiO_2$ or SiN) may be formed on the facets of the mesa structure. In some embodiments, dielectric layer 875 may include multiple layers of dielectric materials. In some embodiments, a metal layer 895 may be formed on dielectric layer 875. Metal layer 895 may include one or more metal or metal alloy materials, such as aluminum (Al), silver (Ag), gold (Au), platinum (Pt), titanium (Ti), copper (Cu), or any combination thereof. Dielectric layer 875 and metal layer 895 may form a mesa reflector that can reflect light emitted by active layer 835 toward substrate 815. In some embodiments, the mesa reflector may be parabolic-shaped to act as a parabolic reflector that may at least partially collimate the emitted light.

Electrical contact 865 and electrical contact 885 may be formed on semiconductor layer 845 and semiconductor layer 825, respectively, to act as electrodes. Electrical contact 865 and electrical contact 885 may each include a conductive material, such as Al, Au, Pt, Ag, Ni, Ti, Cu, or any combination thereof (e.g., Ag/Pt/Au or Al/Ni/Au), and may act as the electrodes of LED 805. In the example shown in FIG. 8B, electrical contact 885 may be an n-contact, and electrical contact 865 may be a p-contact. Electrical contact 865 and semiconductor layer 845 (e.g., a p-type semiconductor layer) may form a back reflector for reflecting light emitted by active layer 835 back toward substrate 815. In some embodiments, electrical contact 865 and metal layer 895 include same material(s) and can be formed using the same processes. In some embodiments, an additional conductive layer (not shown) may be included as an intermediate conductive layer between the electrical contacts 865 and 885 and the semiconductor layers.

When a voltage signal is applied across electrical contacts 865 and 885, electrons and holes may recombine in active layer 835. The recombination of electrons and holes may cause photon emission, thus producing light. The wavelength and energy of the emitted photons may depend on the energy bandgap between the valence band and the conduction band in active layer 835. For example, InGaN active layers may emit green or blue light, while AlInGaP active layers may emit red, orange, yellow, or green light. The emitted photons may propagate in many different directions, and may be reflected by the mesa reflector and/or the back reflector and may exit LED 805, for example, from the bottom side (e.g., substrate 815) shown in FIG. 8B. One or more other secondary optical components, such as a lens or a grating, may be formed on the light emission surface, such as substrate 815, to focus or collimate the emitted light and/or couple the emitted light into a waveguide.

One or two-dimensional arrays of the LEDs described above may be manufactured on a wafer to form light sources (e.g., light source 742). Drive circuits (e.g., drive circuit 744) may be fabricated, for example, on a silicon wafer using complementary metal-oxide-semiconductor (CMOS) processes. The LEDs and the drive circuits on wafers may be diced and then bonded together, or may be bonded on the wafer level and then diced. Various bonding techniques can be used for bonding the LEDs and the drive circuits, such as adhesive bonding, metal-to-metal bonding, metal oxide bonding, wafer-to-wafer bonding, die-to-wafer bonding, hybrid bonding, and the like.

Figure 9A:
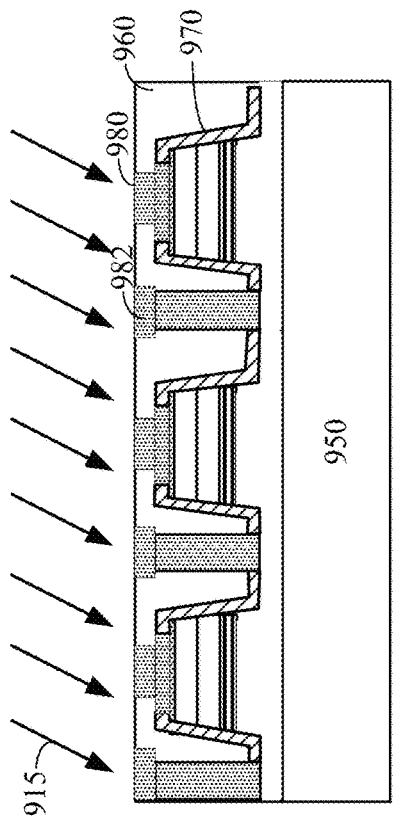
FIGS. 9A-9D illustrate an example of a hybrid bonding process for bonding arrays of LEDs to drive circuits according to certain embodiments.
Figure 9B:
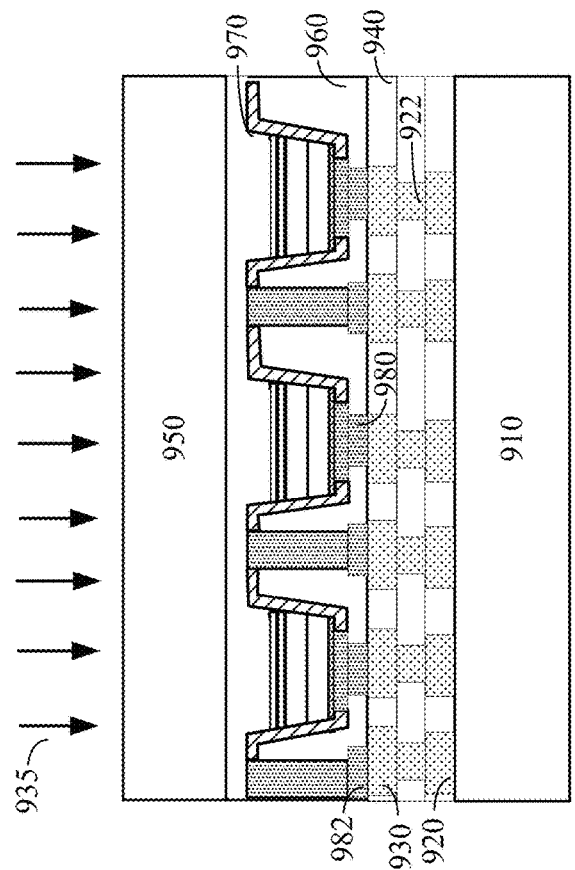

FIGS. 9A-9D illustrate an example of a method of hybrid bonding for arrays of LEDs according to certain embodiments. The hybrid bonding may generally include wafer cleaning and activation, high-precision alignment of contacts of one wafer with contacts of another wafer, dielectric bonding of dielectric materials at the surfaces of the wafers at room temperature, and metal bonding of the contacts by annealing at elevated temperatures. FIG. 9A shows a substrate 910 with passive or active circuits 920 manufactured thereon. As described above with respect to FIGS. 9A-9B, substrate 910 may include, for example, a silicon wafer. Circuits 920 may include drive circuits for the arrays of LEDs. A bonding layer may include dielectric regions 940 and contact pads 930 connected to circuits 920 through electrical interconnects 922. Contact pads 930 may include, for example, Cu, Ag, Au, Al, W, Mo, Ni, Ti, Pt, Pd, or the like. Dielectric materials in dielectric regions 940 may include SiCN, SiO$_2$, SiN, Al$_2$O$_3$, HfO$_2$, ZrO$_2$, Ta$_2$O$_5$, or the like. The bonding layer may be planarized and polished using, for example, chemical mechanical polishing, where the planarization or polishing may cause dishing (a bowl like profile) in the contact pads. The surfaces of the bonding layers may be cleaned and activated by, for example, an ion (e.g., plasma) or fast atom (e.g., Ar) beam 905. The activated surface may be atomically clean and may be reactive for formation of direct bonds between wafers when they are brought into contact, for example, at room temperature.

FIG. 9B illustrates a wafer 950 including an array of micro-LEDs 970 fabricated thereon as described above with respect to, for example, FIGS. 8A-9B. Wafer 950 may be a carrier wafer and may include, for example, GaAs, InP, GaN, AlN, sapphire, SiC, Si, or the like. Micro-LEDs 970 may include an n-type layer, an active region, and a p-type layer epitaxially grown on wafer 950. The epitaxial layers may include various III-V semiconductor materials described above, and may be processed from the p-type layer side to etch mesa structures in the epitaxial layers, such as substantially vertical structures, parabolic structures, conic structures, or the like. Passivation layers and/or reflection layers may be formed on the sidewalls of the mesa structures. P-contacts 980 and n-contacts 982 may be formed in a dielectric material layer 960 deposited on the mesa structures and may make electrical contacts with the p-type layer and the n-type layers, respectively. Dielectric materials in dielectric material layer 960 may include, for example, SiCN, SiO$_2$, SiN, Al$_2$O$_3$, HfO$_2$, ZrO$_2$, Ta$_2$O$_5$, or the like. P-contacts 980 and n-contacts 982 may include, for example, Cu, Ag, Au, Al, W, Mo, Ni, Ti, Pt, Pd, or the like. The top surfaces of p-contacts 980, n-contacts 982, and dielectric material layer 960 may form a bonding layer. The bonding layer may be planarized and polished using, for example, chemical mechanical polishing, where the polishing may cause dishing in p-contacts 980 and n-contacts 982. The bonding layer may then be cleaned and activated by, for example, an ion (e.g., plasma) or fast atom (e.g., Ar) beam 915. The activated surface may be atomically clean and reactive for formation of direct bonds between wafers when they are brought into contact, for example, at room temperature.

Figure 9C:
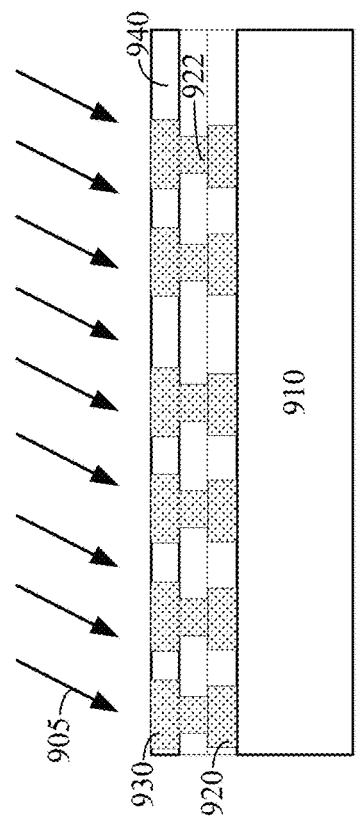

FIG. 9C illustrates a room temperature bonding process for bonding the dielectric materials in the bonding layers. For example, after the bonding layer that includes dielectric regions 940 and contact pads 930 and the bonding layer that includes p-contacts 980, n-contacts 982, and dielectric material layer 960 are surface activated, wafer 950 and micro-LEDs 970 may be turned upside down and brought into contact with substrate 910 and the circuits formed thereon. In some embodiments, compression pressure 925 may be applied to substrate 910 and wafer 950 such that the bonding layers are pressed against each other. Due to the surface activation and the dishing in the contacts, dielectric regions 940 and dielectric material layer 960 may be in direct contact because of the surface attractive force, and may react and form chemical bonds between them because the surface atoms may have dangling bonds and may be in unstable energy states after the activation. Thus, the dielectric materials in dielectric regions 940 and dielectric material layer 960 may be bonded together with or without heat treatment or pressure.

Figure 9D:
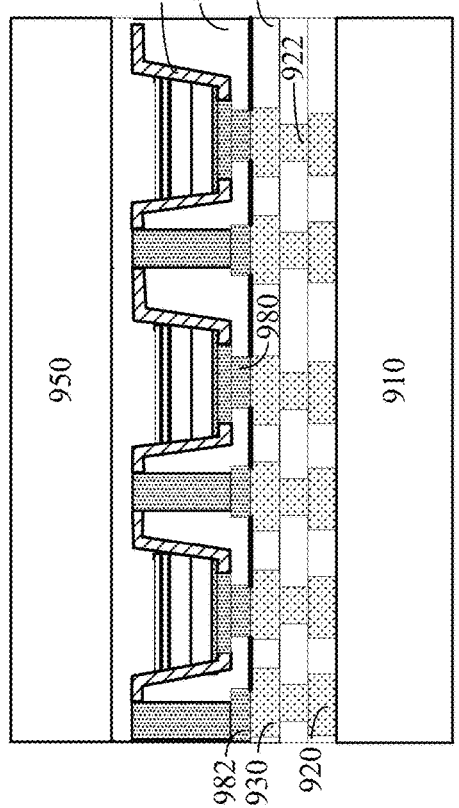

FIG. 9D illustrates an annealing process for bonding the contacts in the bonding layers after bonding the dielectric materials in the bonding layers. For example, contact pads 930 and p-contacts 980 or n-contacts 982 may be bonded together by annealing at, for example, about 200-400° C. or higher. During the annealing process, heat 935 may cause the contacts to expand more than the dielectric materials (due to different coefficients of thermal expansion), and thus may close the dishing gaps between the contacts such that contact pads 930 and p-contacts 980 or n-contacts 982 may be in contact and may form direct metallic bonds at the activated surfaces.

In some embodiments where the two bonded wafers include materials having different coefficients of thermal expansion (CTEs), the dielectric materials bonded at room temperature may help to reduce or prevent misalignment of the contact pads caused by the different thermal expansions. In some embodiments, to further reduce or avoid the misalignment of the contact pads at a high temperature during annealing, trenches may be formed between micro-LEDs, between groups of micro-LEDs, through part or all of the substrate, or the like, before bonding.

Figures 10A, 10B:
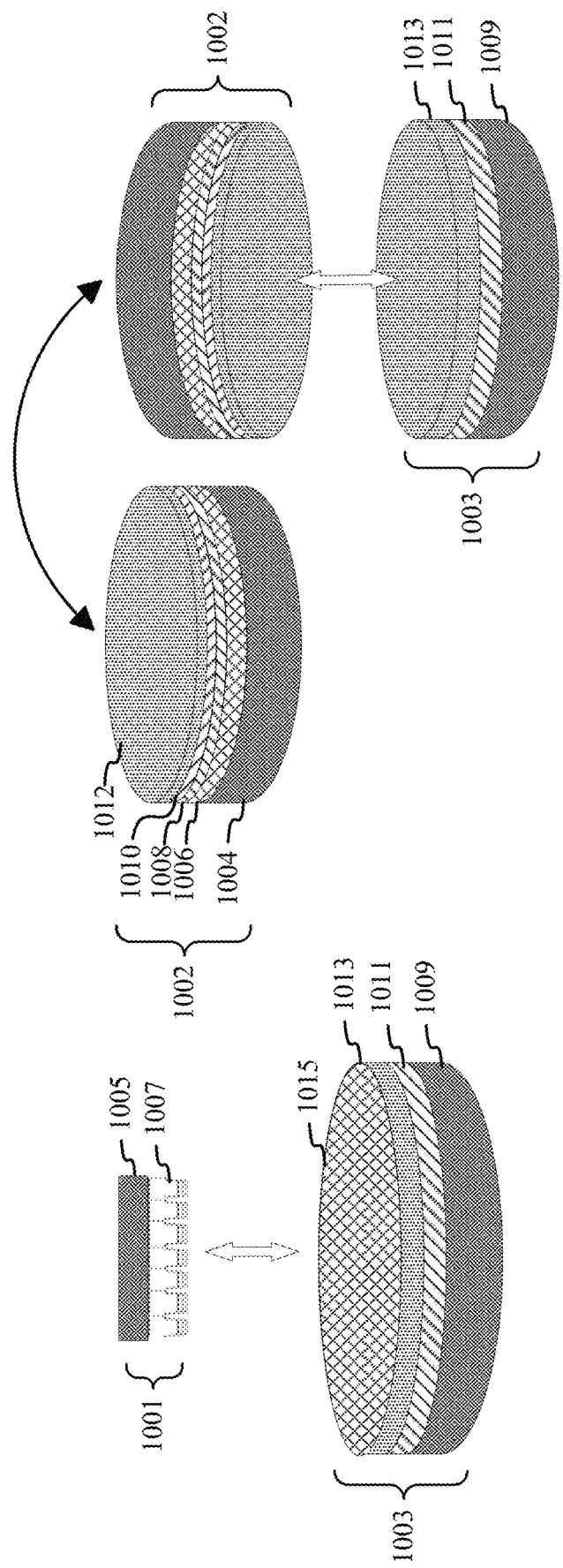
FIG. 10A illustrates an example of a method of die-to-wafer bonding for bonding arrays of LEDs to drive circuits according to certain embodiments.
FIG. 10B illustrates an example of a method of wafer-to-wafer bonding for bonding arrays of LEDs to drive circuits according to certain embodiments.

FIG. 10A illustrates an example of a method of die-to-wafer bonding for arrays of LEDs according to certain embodiments. In the example shown in FIG. 10A, an LED array 1001 may include a plurality of LEDs 1007 on a carrier substrate 1005. Carrier substrate 1005 may include various materials, such as GaAs, InP, GaN, AlN, sapphire, SiC, Si, or the like. LEDs 1007 may be fabricated by, for example, growing various epitaxial layers, forming mesa structures, and forming electrical contacts or electrodes, before performing the bonding. The epitaxial layers may include various materials, such as GaN, InGaN, (AlGaIn)P, (AlGaIn)AsP, (AlGaIn)AsN, (Eu:InGa)N, (AlGaIn)N, or the like, and may include an n-type layer, a p-type layer, and an active layer that includes one or more heterostructures, such as one or more quantum wells or MQWs. The electrical contacts may include various conductive materials, such as a metal or a metal alloy.

A wafer 1003 may include a base layer 1009 having passive or active integrated circuits (e.g., drive circuits 1011) fabricated thereon. Base layer 1009 may include, for example, a silicon wafer. Drive circuits 1011 may be used to control the operations of LEDs 1007. For example, the drive circuit for each LED 1007 may include a two-transistor one-capacitor (2T1C) pixel structure that has two transistors and one capacitor. Wafer 1003 may also include a bonding layer 1013. Bonding layer 1013 may include various materials, such as a metal, an oxide, a dielectric, CuSn, AuTi, and the like. In some embodiments, a patterned layer 1015 may be formed on a surface of bonding layer 1013, where patterned layer 1015 may include a metallic grid made of a conductive material, such as Cu, Ag, Au, Al, or the like.

LED array 1001 may be bonded to wafer 1003 via bonding layer 1013 or patterned layer 1015. For example, patterned layer 1015 may include metal pads or bumps made of various materials, such as CuSn, AuSn, or nanoporous Au, that may be used to align LEDs 1007 of LED array 1001 with corresponding drive circuits 1011 on wafer 1003. In one example, LED array 1001 may be brought toward wafer 1003 until LEDs 1007 come into contact with respective metal pads or bumps corresponding to drive circuits 1011. Some or all of LEDs 1007 may be aligned with drive circuits 1011, and may then be bonded to wafer 1003 via patterned layer 1015 by various bonding techniques, such as metal-to-metal bonding. After LEDs 1007 have been bonded to wafer 1003, carrier substrate 1005 may be removed from LEDs 1007.

For high-resolution micro-LED display panel, due to the small pitches of the micro-LED array and the small dimensions of individual micro-LEDs, it can be challenging to electrically connect the drive circuits to the electrodes of the LEDs. For example, in the face-to-face bonding techniques describe above, it is difficult to precisely align the bonding pads on the micro-LED devices with the bonding pads on the drive circuits and form reliable bonding at the interfaces that may include both dielectric materials (e.g., $SiO_2$, SiN, or SiCN) and metal (e.g., Cu, Au, or Al) bonding pads. In particular, when the pitch of the micro-LED device is about 2 or 3 microns or lower, the bonding pads may have a linear dimension less than about 1 μm in order to avoid shorting to adjacent micro-LEDs and to improve bonding strength for the dielectric bonding. However, small bonding pads may be less tolerant to misalignments between the bonding pads, which may reduce the metal bonding area, increase the contact resistance (or may even be an open circuit), and/or cause diffusion of metals to the dielectric materials and the semiconductor materials. Thus, precise alignment of the bonding pads on surfaces of the micro-LED arrays and bonding pads on surfaces of CMOS backplane may be needed in the conventional processes. However, the accuracy of die-to-wafer or wafer-to-wafer bonding alignment using state-of-art equipment may be on the order of about 0.5 μm or about 1 μm, which may not be adequate for bonding the small-pitch micro-LED arrays (e.g., with a linear dimension of the bonding pads on the order of 1 μm or shorter) to CMOS drive circuits.

In some implementations, to avoid precise alignment for the bonding, a micro-LED wafer may be bonded to a CMOS backplane after the epitaxial layer growth and before the formation of individual micro-LED on the micro-LED wafer, where the micro-LED wafer and the CMOS backplane may be bonded through metal-to-metal bonding of two solid metal bonding layers on the two wafers. No alignment would be needed to bond the solid contiguous metal bonding layers. After the bonding, the epitaxial layers on the micro-LED wafer and the metal bonding layers may be etched to form individual micro-LEDs. The etching process may have much higher alignment accuracy and thus may form individual micro-LEDs that align with the underlying pixel drive circuits.

FIG. 10B illustrates an example of a method of wafer-to-wafer bonding for arrays of LEDs according to certain embodiments. As shown in FIG. 10B, a first wafer 1002 may include a substrate 1004, a first semiconductor layer 1006, active layers 1008, and a second semiconductor layer 1010. Substrate 1004 may include various materials, such as GaAs, InP, GaN, AlN, sapphire, SiC, Si, or the like. First semiconductor layer 1006, active layers 1008, and second semiconductor layer 1010 may include various semiconductor materials, such as GaN, InGaN, (AlGaIn)P, (AlGaIn)AsP, (AlGaIn)AsN, (AlGaIn)Pas, (Eu:InGa)N, (AlGaIn)N, or the like. In some embodiments, first semiconductor layer 1006 may be an n-type layer, and second semiconductor layer 1010 may be a p-type layer. For example, first semiconductor layer 1006 may be an n-doped GaN layer (e.g., doped with Si or Ge), and second semiconductor layer 1010 may be a p-doped GaN layer (e.g., doped with Mg, Ca, Zn, or Be). Active layers 1008 may include, for example, one or more GaN layers, one or more InGaN layers, one or more AlInGaP layers, and the like, which may form one or more heterostructures, such as one or more quantum wells or MQWs.

In some embodiments, first wafer 1002 may also include a bonding layer. Bonding layer 1012 may include various materials, such as a metal, an oxide, a dielectric, CuSn, AuTi, or the like. In one example, bonding layer 1012 may include p-contacts and/or n-contacts (not shown). In some embodiments, other layers may also be included on first wafer 1002, such as a buffer layer between substrate 1004 and first semiconductor layer 1006. The buffer layer may include various materials, such as polycrystalline GaN or AlN. In some embodiments, a contact layer may be between second semiconductor layer 1010 and bonding layer 1012. The contact layer may include any suitable material for providing an electrical contact to second semiconductor layer 1010 and/or first semiconductor layer 1006.

First wafer 1002 may be bonded to wafer 1003 that includes drive circuits 1011 and bonding layer 1013 as described above, via bonding layer 1013 and/or bonding layer 1012. Bonding layer 1012 and bonding layer 1013 may be made of the same material or different materials. Bonding layer 1013 and bonding layer 1012 may be substantially flat. First wafer 1002 may be bonded to wafer 1003 by various methods, such as metal-to-metal bonding, eutectic bonding, metal oxide bonding, anodic bonding, thermo-compression bonding, ultraviolet (UV) bonding, and/or fusion bonding.

As shown in FIG. 10B, first wafer 1002 may be bonded to wafer 1003 with the p-side (e.g., second semiconductor layer 1010) of first wafer 1002 facing down (i.e., toward wafer 1003). After bonding, substrate 1004 may be removed from first wafer 1002, and first wafer 1002 may then be processed from the n-side. The processing may include, for example, the formation of certain mesa shapes for individual LEDs, as well as the formation of optical components corresponding to the individual LEDs.

After the micro-LEDs are bonded to the drive circuits, the substrate on which the micro-LEDs are fabricated may be thinned or removed, and various secondary optical components may be fabricated on the light emitting surfaces of the micro-LEDs to, for example, extract, collimate, and redirect the light emitted from the active regions of the micro-LEDs. In one example, micro-lenses may be formed on the micro-LEDs, where each micro-lens may correspond to a respective micro-LED and may help to improve the light extraction efficiency and collimate the light emitted by the micro-LED. In some embodiments, the secondary optical components may be fabricated in the substrate or the n-type layer of the micro-LEDs. In some embodiments, the secondary optical components may be fabricated in a dielectric layer deposited on the n-type side of the micro-LEDs. Examples of the secondary optical components may include a lens, a grating, an antireflection (AR) coating, a prism, a photonic crystal, or the like.

Figure 11:
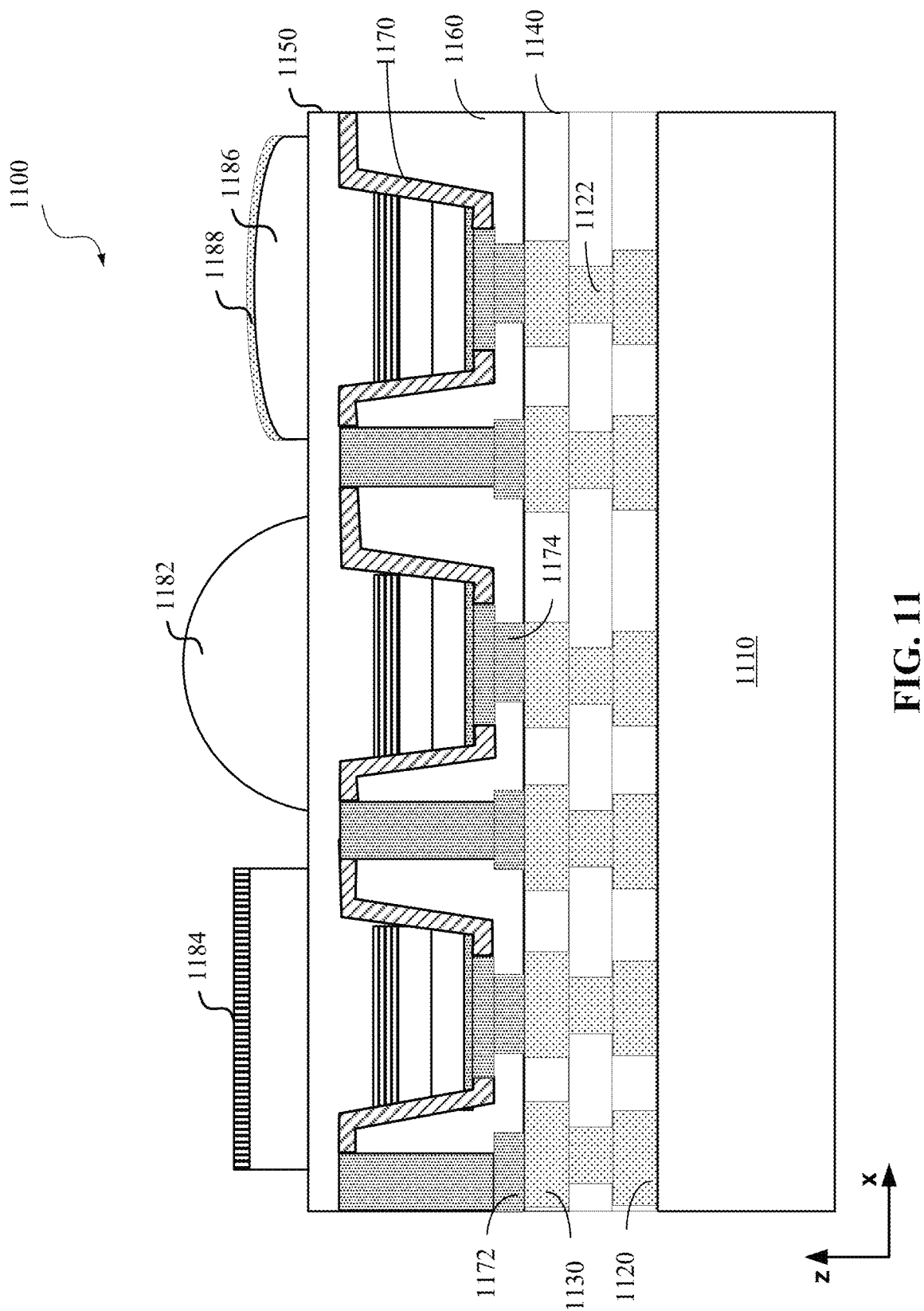
FIG. 11 illustrates an example of an LED array with secondary optical components fabricated thereon according to certain embodiments.

FIG. 11 illustrates an example of an LED array 1100 with secondary optical components fabricated thereon according to certain embodiments. LED array 1100 may be made by bonding an LED chip or wafer with a silicon wafer including electrical circuits fabricated thereon, using any suitable bonding techniques described above with respect to, for example, FIGS. 9A-9D. In the example shown in FIG. 11, LED array 1100 may be bonded using a wafer-to-wafer hybrid bonding technique as described above with respect to FIG. 9A-9D. LED array 1100 may include a substrate 1110, which may be, for example, a silicon wafer. Integrated circuits 1120, such as LED drive circuits, may be fabricated on substrate 1110. Integrated circuits 1120 may be connected to p-contacts 1174 and n-contacts 1172 of micro-LEDs 1170 through interconnects 1122 and contact pads 1130, where contact pads 1130 may form metallic bonds with p-contacts 1174 and n-contacts 1172. Dielectric layer 1140 on substrate 1110 may be bonded to dielectric layer 1160 through fusion bonding.

The substrate (not shown) of the LED chip or wafer may be thinned or may be removed to expose the n-type layer 1150 of micro-LEDs 1170. Various secondary optical components, such as a spherical micro-lens 1182, a grating 1184, a micro-lens 1186, an antireflection layer 1188, and the like, may be formed in or on top of n-type layer 1150. For example, spherical micro-lens arrays may be etched in the semiconductor materials of micro-LEDs 1170 using a gray-scale mask and a photoresist with a linear response to exposure light, or using an etch mask formed by thermal reflowing of a patterned photoresist layer. The secondary optical components may also be etched in a dielectric layer deposited on n-type layer 1150 using similar photolithographic techniques or other techniques. For example, micro-lens arrays may be formed in a polymer layer through thermal reflowing of the polymer layer that is patterned using a binary mask. The micro-lens arrays in the polymer layer may be used as the secondary optical components or may be used as the etch mask for transferring the profiles of the micro-lens arrays into a dielectric layer or a semiconductor layer. The dielectric layer may include, for example, SiCN, $SiO_2$, SiN, $Al_2O_3$, $HfO_2$, $ZrO_2$, $Ta_2O_5$, or the like. In some embodiments, a micro-LED 1170 may have multiple corresponding secondary optical components, such as a micro-lens and an antireflection coating, a micro-lens etched in the semiconductor material and a micro-lens etched in a dielectric material layer, a micro-lens and a grating, a spherical lens and an aspherical lens, and the like. Three different secondary optical components are illustrated in FIG. 11 to show some examples of secondary optical components that can be formed on micro-LEDs 1170, which does not necessary imply that different secondary optical components are used simultaneously for every LED array.

The overall efficiency of a near-eye display, such as near-eye display 400, optical system 500, augmented reality system 600, and NED device 602 or 604 may be a product of the efficiency of individual components and may also depend on how the components are connected or arranged. For example, the overall efficiency $\eta_{tot}$ of the near-eye display of FIG. 5 may depend on the light emitting efficiency of image source 520, and the efficiency of coupling light from image source 520 to user's eye 590 by display optics 510. The overall efficiency $\eta_{tot}$ of the waveguide-based display in augmented reality system 600 may depend on the light emitting efficiency of image source 612, the light coupling efficiency from image source 612 into combiner 615 by projector optics 614 and input coupler 630, and the output coupling efficiency of output coupler 632, and thus may be determined by:

$$\eta_{tot}=N_{EQE}\times\eta_{in}\times\eta_{out},$$

where $\eta_{EQE}$ is the external quantum efficiency of image source 612, $\eta_{in}$ is the in-coupling efficiency of light from image source 612 into the waveguide (e.g., substrate 620), and $\eta_{out}$ is the outcoupling efficiency of light from the waveguide towards the user's eye by output coupler 632. Thus, the overall efficiency $\eta_{tot}$ of the waveguide-based display can be improved by improving one or more of $\eta_{EQE}$, $\eta_{in}$, and $\eta_{out}$.

The external quantum efficiency may be affected by the efficiency of extracting light from the image source. For example, at the light emitting surface of the image source (e.g., the interface between image source and air), light with incidence angles greater than the critical angle for total internal reflection may be reflected back to the image source, and thus only a portion of the light generated by the image source may exit the image source. The light coupling efficiency from the image source to user's eyes by the display optics may be affected by the beam profile of the light beam emitted by the image source. For example, for a display system with a limited acceptance angular range (e.g., within ±20°, if the light beam emitted by a light emitter (e.g., micro-LED) has a wide beam profile (e.g., a Lambertian emission profile), only a small fraction of the total light emitted by the light emitter may be captured by the display optics and delivered to the user's eyes. In some embodiments, to improve the efficiency of extracting light from the light source (and thus the external quantum efficiency) and the efficiency of coupling the extracted light to user's eye, a micro-lens array may be used to reduce the total internal reflection at the light emitting surface, and modify the beam profiles of (e.g., collimating) the light beams emitted by the array of light emitters.

Figure 12:
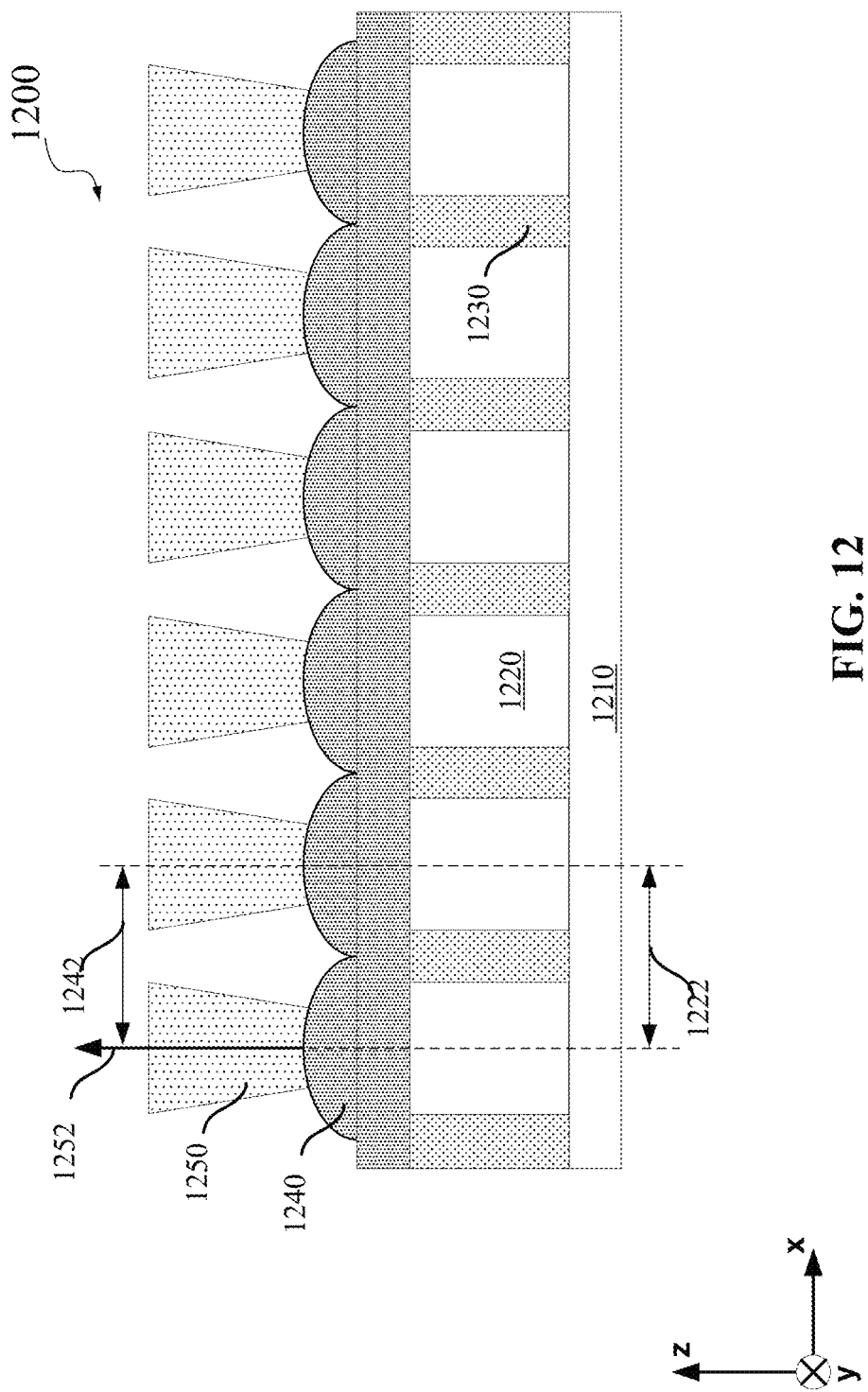
FIG. 12 illustrates an example of a micro-LED device including a micro-LED array and an array of micro-lenses.

FIG. 12 illustrates an example of a device 1200 including a micro-LED array 1220 and a micro-lens array 1240 for light extraction from micro-LED array 1220. Micro-LED array 1220 may include a one-dimensional or two-dimensional array of micro-LEDs, where the micro-LEDs may be uniformly distributed and may be separated by, for example, insulators 1230, conductors, or any combinations thereof. Micro-LED array 1220 may include epitaxial structures formed on a substrate 1210, or a metal and/or insulator layer formed on substrate 1210, as described above with respect to, for example, FIGS. 8A-11. Insulators 1230 may include, for example, passivation layers (e.g., passivation layer 870), light reflection layers, filling materials (e.g., polymers), and the like.

Micro-lens array 1240 may be formed directly on micro-LED array 1220 or may be formed on a substrate and then bonded to micro-LED array 1220. For example, micro-lens array 1240 may be etched in a dielectric layer of micro-LED array 1220, such as a substrate or an oxide layer (e.g., a $SiO_2$ layer) of micro-LED array 1220, or may be formed on a dielectric layer deposited on micro-LED array 1220, such as an oxide layer or a nitride layer. In the example shown in FIG. 12, micro-lens array 1240 may align with micro-LED array 1220, where a pitch 1222 of micro-LED array 1220 may be the same as the pitch 1242 of micro-lens array 1240, and the optical axis of each micro-lens in micro-lens array 1240 may align with a center of a respective micro-LED in micro-LED array 1220. Thus, the chief ray of the light from each micro-LED after passing through the corresponding micro-lens may be the same, such as in the direction of the optical axis or perpendicular to micro-LED array 1220 (e.g., the z direction).

As shown in FIG. 12, a light beam 1250 from each micro-lens in micro-lens array 1240 may have a peak luminance direction 1252 aligned with the optical axis of the corresponding micro-lens. For example, peak luminance direction 1252 of light beam 1250 may be at 90° with respect to micro-lens array 1240 or micro-LED array 1220. The focal length and the distance of the micro-lenses from the corresponding micro-LEDs may be configured such that light beam 1250 may be a collimated beam, a converging beam, or a diverging beam.

In some embodiments, pitch 1222 of micro-LED array 1220 may be the same as pitch 1242 of micro-lens array 1240, but micro-lens array 1240 may not be align with micro-LED array 1220, where the optical axis of each micro-lens in micro-lens array 1240 may be offset from the center of a respective micro-LED in micro-LED array 1220. As such, the peak luminance direction of each light beam after passing through the respective micro-lens may not align with the optical axis of each micro-lens. However, because the pitch matching, the peak luminance directions of the light beams after passing through micro-lens array 1240 may be in the same direction.

As described above, the overall efficiency of a near-eye display system may be the product of the efficiency of individual components in the display system and may also depend on how the components are coupled together. When the emission angles of light emitters in an array of light emitters are uniformly controlled (e.g., collimated and propagating in the same direction), light emitted by the light emitters may not be uniformly collected and delivered to the eyebox of the display system. For example, light emitted by light emitters near edges of the array of light emitters may be collected and delivered to the eyebox of the display system at lower efficiencies than light emitted by light emitters at the center of the array of light emitters, which may cause non-uniform intensity or brightness variation in the displayed images. Therefore, light emitted from light emitters at the edges of the array of light emitters may need to be deflected differently than light emitted from light emitters at the center of the array of light emitters.

Figure 13A:
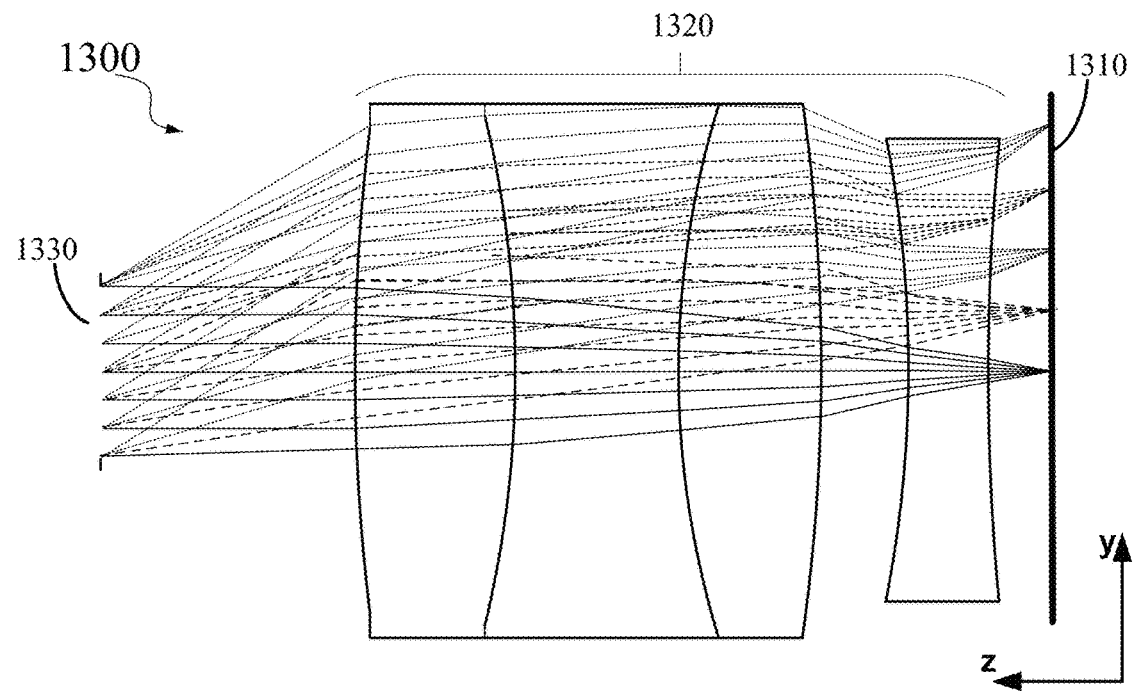
FIG. 13A illustrates an example of a micro-LED-based display system including a micro-LED array and display optics.
Figure 13B:
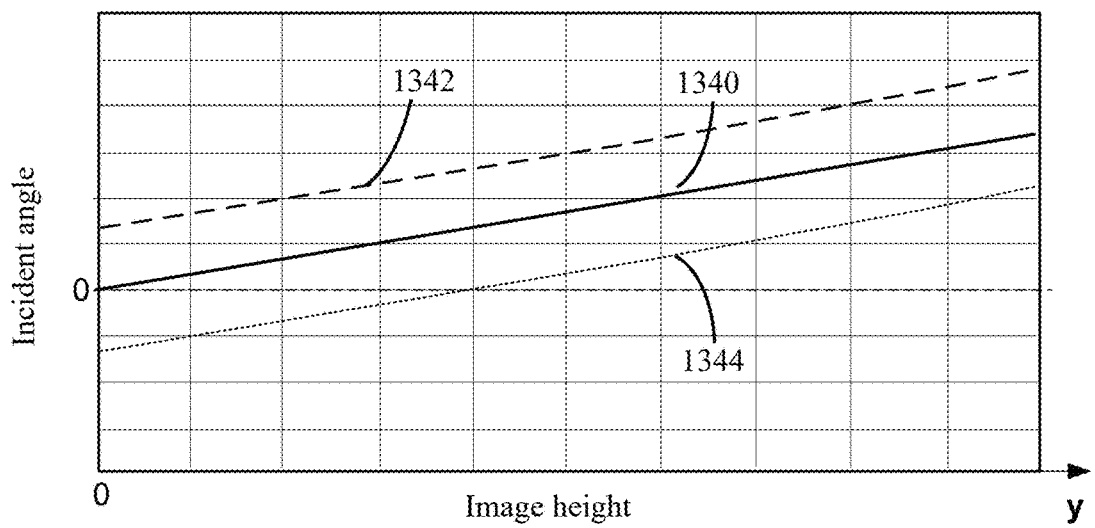
FIG. 13B illustrates examples of the incident angles of light beams emitted by the micro-LED array and collected by the display optics of FIG. 13A.

FIG. 13A illustrates an example of a micro-LED-based display system 1300 including a micro-LED array 1310 (e.g., including a one dimensional or two-dimensional array of micro-LEDs) and display optics 1320. In the example shown in FIG. 13A, the size of micro-LED array 1310 may be larger than the input aperture of display optics 1320. FIG. 13B illustrates examples of the incident angles of light beams emitted by micro-LED array 1310 and collected by display optics 1320 of FIG. 13A. As shown in FIG. 13A, due to the limited field of view (or acceptance angle) and the size of an exit pupil 1330 (or eyebox) of display system 1300, different angular portions of the light emitted by respective micro-LEDs in micro-LED array 1310 may pass through exit pupil 1330 of display system 1300. For example, as shown by a line 1340 in FIG. 13B, the chief ray from a micro-LED at the center of micro-LED array 1310 may be incident on display optics 1320 at about 0°, while the chief ray from a micro-LED at an edge of micro-LED array 1310 may be incident on display optics 1320 at, for example, about 20° or a larger angle. Lines 1342 and 1344 show the angular range of the light emitted by each micro-LED at a respective height in micro-LED array 1310 that can reach the user's eyes. When the light intensity of the light beam from each micro-LED is not uniform in all directions (such as having a Gaussian beam profile), light from different micro-LEDs may be projected to the user's eyes at different efficiencies due to the different angular portions of light from the respective micro-LEDs in micro-LED array 1310 that can pass through exit pupil 1330.

Figure 13C:
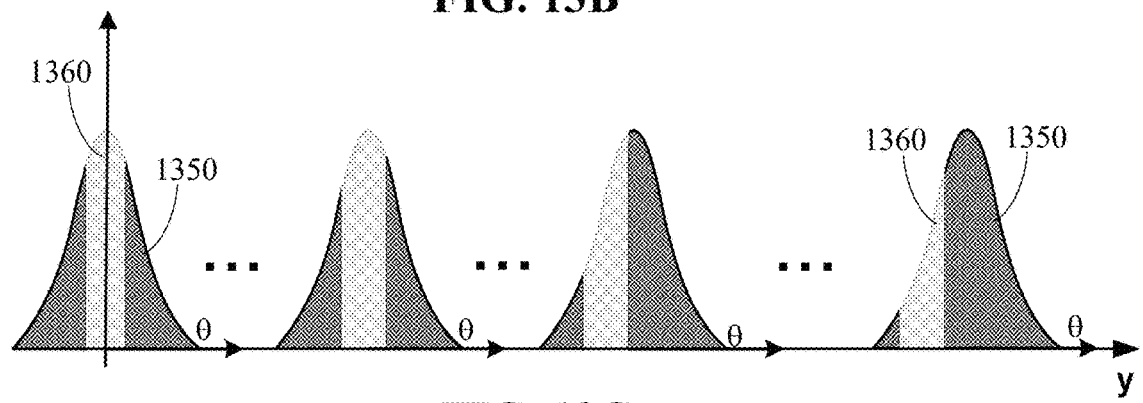
FIG. 13C illustrates examples of the portions of the light beams emitted by the micro-LED array of FIG. 13A that may be collected and projected by the display optics to user's eyes.

FIG. 13C illustrates examples of the portions of light beams emitted by micro-LED array 1310 that may be collected and projected by display optics 1320 to user's eyes. As described above, the beam profile 1350 of the light beam emitted from each micro-LED in micro-LED array 1310 may have a certain FWHM angular range (e.g., about ±15°, about ±20°, or larger). Due to the limited acceptance angles and the limited size of the exit pupil of display system 1300, only a portion of each light beam may reach a user's eye through display optics 1320. In addition, due to the different chief ray angles from different micro-LEDs in micro-LED array 1310 described above, the portion of each light beam that can reach the user's eyes may be within a different respective angular range for each respective micro-LED as shown in FIGS. 13A and 13C. The total power of the light beam emitted by each micro-LED may be indicated by the total area under a beam profile 1350 that represents the brightness (or intensity) profile of the light beam as a function of the emission angle. The total power of each light beam that may reach the user's eye may be indicated by the total area of a bright region 1360 under beam profile 1350, which may only be a portion of the total area under beam profile 1350. For micro-LEDs at the center (e.g., y=0) of micro-LED array 1310, the area of bright region 1360 may be a large portion of the total area below beam profile 1350 because light with small emission angles may be collected by display optics 1320 and the light beam has higher intensities at small emission angles. As such, the coupling efficiencies may be high for micro-LEDs at the center of micro-LED array 1310. However, for micro-LEDs at the edges of micro-LED array 1310, the area of bright region 1360 may only be a small portion of the total area below beam profile 1350 as shown in FIG. 13C because only light with large emission angles may be collected by display optics 1320 and the light beam has lower intensities at large emission angles. In other words, the area of bright region 1360, and thus the coupling efficiency of the micro-LEDs in micro-LED array 1310, may decrease significantly from the center to the edges of micro-LED array 1310. This effect may be referred to as the Brightness-Roll-Off (BRO) effect.

Figure 14:
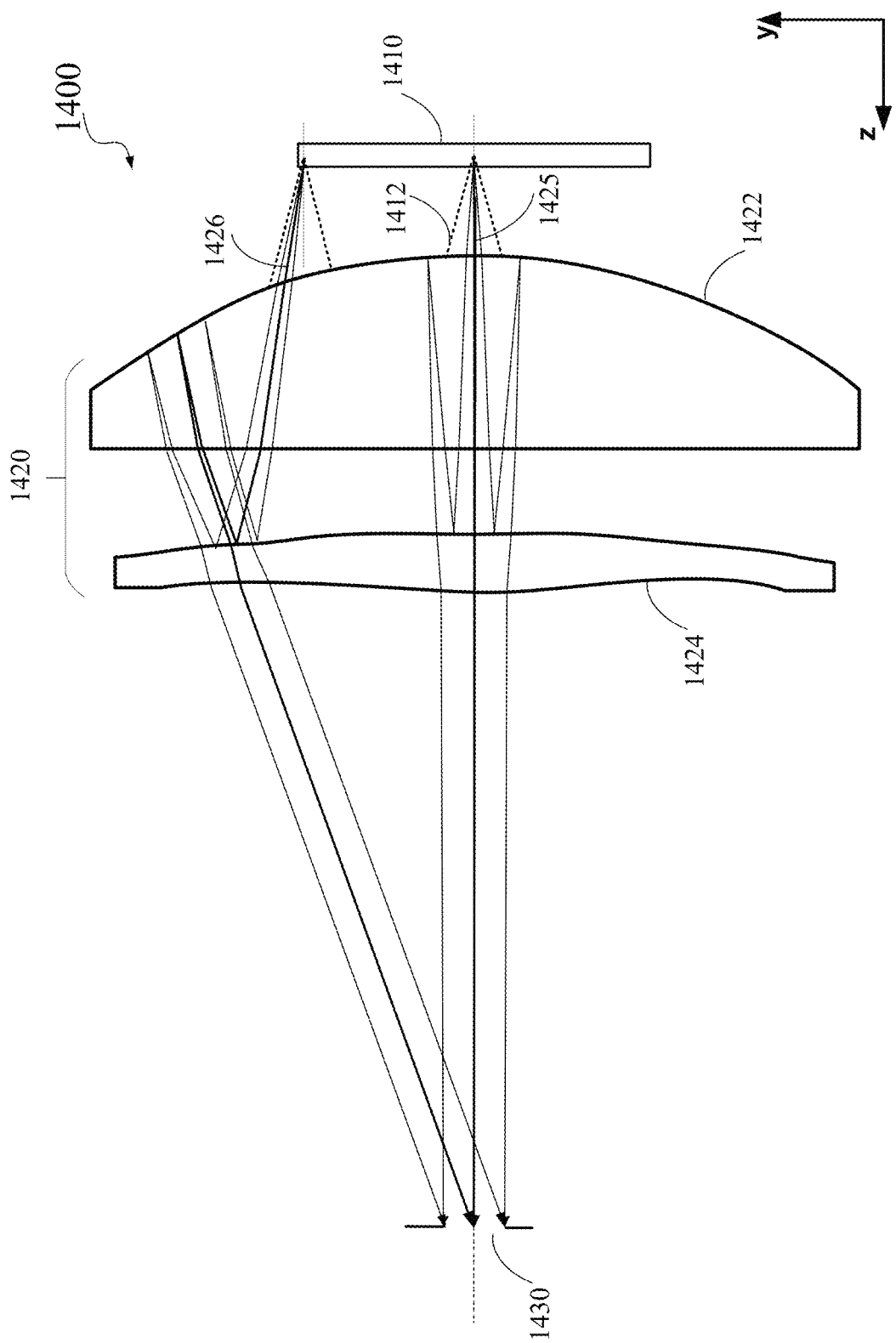
FIG. 14 illustrates another example of a near-eye display including a display panel and display optics.

FIG. 14 illustrates another example of a near-eye display 1400 including a display panel 1410 and display optics 1420. In the example shown in FIG. 14, the size of display panel 1410 may be smaller than the input aperture of display optics 1420. Display optics 1420 may include one or more lenses, such as lenses 1422 and 1424. Display panel 1410 may include a two-dimensional array of micro-LEDs. Display panels are generally designed to have uniform viewing angle properties, where the light beam emitted by each region of the display panel may have a beam profile with the peak luminance direction perpendicular to the display panel. For example, each micro-LED of display panel 1410 may have a similar emission cone 1412. However, as described above, the portion of the light within emission cone 1412 that may reach the user's eyes may vary across the display panel, and the user's viewing angle (and the chief ray angle) for each region of display panel 1410 may vary across the display panel. For example, as illustrated, the chief ray for the center region of display panel 1410 may be in the surface-normal direction of display panel 1410, but the chief ray for other regions of display panel 1410 may be tilted at different angles with respect to the surface-normal direction of display panel 1410. The mismatch between the display peak luminance angle and the chief ray angle may lead to brightness variations depending on the user's gaze direction (the BRO effect), as described above with respect to FIG. 13C.

For example, FIG. 14 shows a chief ray 1425 for the center region of display panel 1410, and a chief ray 1426 for a peripheral region of display panel 1410. The direction of chief ray 1425 for the center region of display panel 1410 may match the peak luminance direction (e.g., the surface-normal direction) of the light beam emitted by the micro-LEDs at the center region of display panel 1410, and thus the portion of the light emitted by the center region of display panel 1410 that reaches exit pupil 1430 of near-eye display 1400 may have a higher intensity. Therefore, the center region of display panel 1410 may appear to have a higher brightness to the user's eye. The direction of chief ray 1426 for the peripheral region of display panel 1410 may not match the peak luminance direction of the micro-LEDs, and thus the portion of the light emitted by the peripheral region of display panel 1410 that reaches exit pupil 1430 of near-eye display 1400 may have a lower intensity. Therefore, the peripheral region of display panel 1410 may appear to have a lower brightness to the user's eye due to the BRO effect.

As shown by the examples described with respect to FIGS. 13A-14, to improve the energy efficiency of the near-eye display and the uniformity of the brightness of the displayed images, light emitted from micro-LEDs at the edges of an micro-LED array in a display panel may need to be deflected differently than light emitted from micro-LEDs at the center of the micro-LED array, such that the peak luminance direction of the deflected light beam of each micro-LED of the display panel may match or close to the chief ray angle for the micro-LED. One technique to deflect light emitted by different micro-LEDs differently is using a micro-lens array that includes decentered micro-lenses for at least some micro-LEDs. For example, the micro-lens array may have a pitch different from the pitch of the array of micro-LEDs or may otherwise be configured to have a variable displacement between the center of a micro-LED and the center of a corresponding micro-lens across the micro-LED array, such that the light beam emitted by each micro-LED in the micro-LED array may not only be collimated (or focused or diverged) by the corresponding micro-lens, but may also be deflected at a respective deflection angle towards the display optics by the corresponding micro-lens.

Figure 15A:
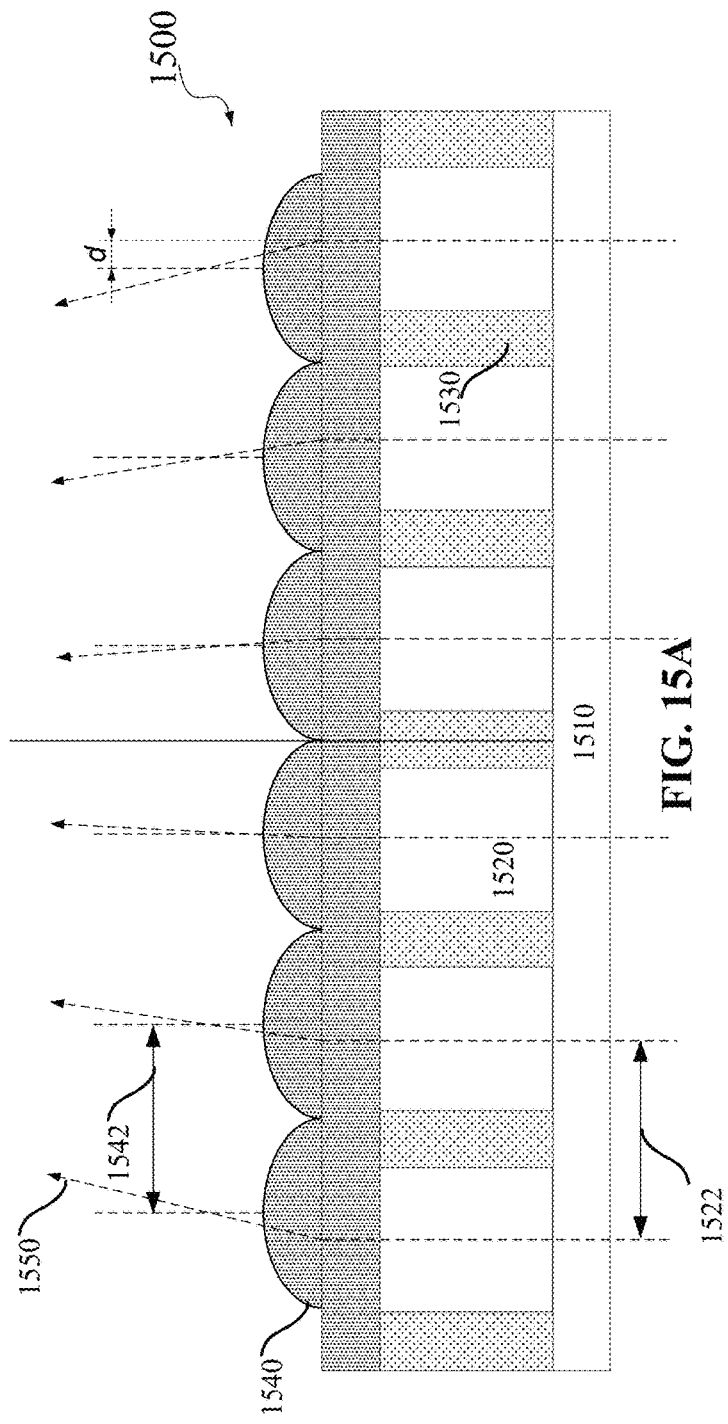
FIG. 15A illustrates an example of a micro-LED device including a micro-LED array and a micro-lens array for extracting and deflecting light emitted by the micro-LED array.

FIG. 15A illustrates an example of a micro-LED device 1500 including a micro-LED array 1520 and a micro-lens array 1540 for extracting and deflecting light emitted by micro-LED array 1520. Micro-LED array 1520 may include a one-dimensional or two-dimensional array of micro-LEDs, where the micro-LEDs may be uniformly distributed and may be separated by, for example, insulators 1530, conductors, or any combinations of conductors and insulators. Micro-LED array 1520 may include epitaxial structures formed on a substrate 1510 as described above with respect to, for example, FIGS. 8A-12. Insulators 1530 may include, for example, passivation layers (e.g., passivation layer 870), light reflection layers, filling materials (e.g., polymers), and the like.

Micro-lens array 1540 may be formed directly on micro-LED array 1520 or may be formed on a substrate and then bonded to micro-LED array 1520. For example, micro-lens array 1540 may be etched in a dielectric layer or a semiconductor layer of micro-LED array 1520, such as a substrate or an oxide layer (e.g., a $SiO_2$ layer) of micro-LED array 1520, or may be formed on a dielectric layer deposited on micro-LED array 1520, such as an oxide layer or a polymer layer. The focal length and the distance of the micro-lenses from the corresponding micro-LEDs may be configured such that light beam from each micro-lens may be a collimated beam, a converging beam, or a diverging beam.

A pitch 1522 of micro-LED array 1520 may be different from (e.g., less than or greater than) a pitch 1542 of micro-lens array 1540, and thus the optical axis of each micro-lens in micro-lens array 1540 may be offset from the center of a respective micro-LED in micro-LED array 1520 by a different displacement d. As such, the light beam from each micro-LED may be deflected by the corresponding micro-lens by a different respective deflection angle. In the example shown in FIG. 15A, pitch 1522 of micro-LED array 1520 may be greater than pitch 1542 of micro-lens array 1540, and thus the optical axis of each micro-lens in micro-lens array 1540 may be offset from the center of a respective micro-LED in micro-LED array 1520 by a different respective displacement d. The displacement d may be a function of the location of the micro-LED. For example, the displacement d may linearly increase as a function of the distance of the micro-LED from the center of micro-LED device 1500, and thus the deflection angle of the light beam of a micro-LED by a corresponding micro-lens may gradually increase as the distance of the micro-LED from the center of micro-LED device 1500 increases. As a result, the light beams from the micro-LEDs may be deflected by the corresponding micro-lenses to different directions as shown by lines 1550 and may converge as shown in the example. Therefore, the peak luminance directions of the light beams from different micro-LEDs after passing through the corresponding micro-lenses may be different. Micro-LED device 1500 may be used to replace micro-LED array 1310 of micro-LED-based display system 1300 to improve the coupling efficiency and brightness uniformity.

In various embodiments, the pitch of micro-lens array 1540 may be uniform or non-uniform. For example, the pitch of a two-dimensional micro-lens array may be uniform in two orthogonal directions, uniform in one direction only, or non-uniform in both directions. The pitch may also be the same or different in the two orthogonal directions. The pitch of micro-lens array 1540 may be different from the pitch of the micro-LED array in one or two dimensions.

Figure 15B:
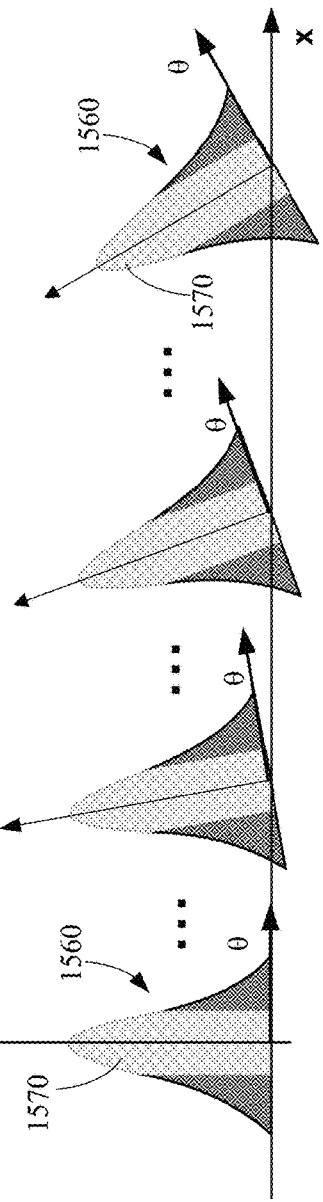
FIG. 15B illustrates examples of the portions of the light beams emitted by the micro-LED array of the micro-LED device of FIG. 15A that may be collected by the display optics of a near-eye display.

FIG. 15B illustrates examples of the portions of the light beams emitted by micro-LED array 1520 of micro-LED device 1500 that may be collected by the display optics (e.g., display optics 1320 or 1420) of a near-eye display. In the illustrated examples, after the collimation by the micro-lenses of micro-lens array 1540, the beam profile 1560 of the light beam emitted from each micro-LED in micro-LED array 1520 may have a certain FWHM angular range (e.g., about ±15°, about ±20°, or larger). The total power of each light beam may be indicated by the total area under beam profile 1560 that represents the brightness profile of the light beam as a function of the emission angle. Due to the different beam deflection angles by the micro-lenses described above with respect to FIG. 15A, the peak luminance direction of the deflected light beam of each micro-LED may match or close to the chief ray angle for the micro-LED. Therefore, the portion of the light beam that can reach the user's eyes may be within a similar angular range where the portion of the light beam may have the highest intensity or brightness for each respective micro-LED as shown by bright regions 1570 in FIG. 15B. Thus, the total power of each light beam that may reach the user's eye as indicated by the total area of bright region 1570 under beam profile 1560 may be substantially the same and can be high. Therefore, the coupling efficiencies of the light emitted by the micro-LEDs in the micro-LED array may be about the same from the center to the edges of the micro-LED array. As such, both the coupling efficiencies and the uniformity of the coupling efficiencies may be improved for the micro-LEDs in the micro-LED array.

Figure 15C:
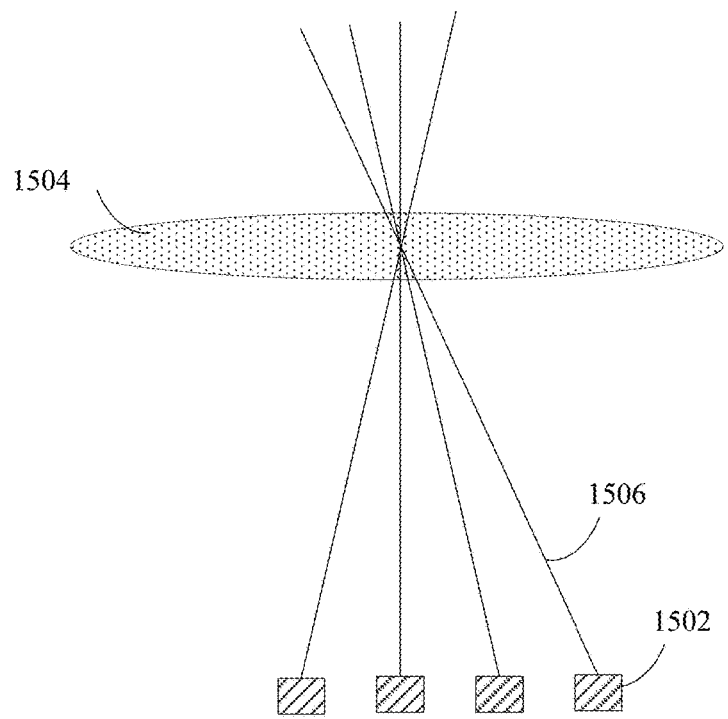
FIG. 15C illustrates an example of a display system that includes display optics and a micro-LED device including a micro-LED array and a micro-lens array as described with respect to FIG. 15A.

FIG. 15C illustrates an example of a display system that includes display optics 1504 and a micro-LED device 1502 including a micro-LED array and a micro-lens array as described with respect to FIG. 15A. In the illustrated example, the deflection angles of light beams of the micro-LEDs by the micro-lenses as indicated by lines 1506 may match the chief ray angles from the micro-LEDs.

Figure 15D:
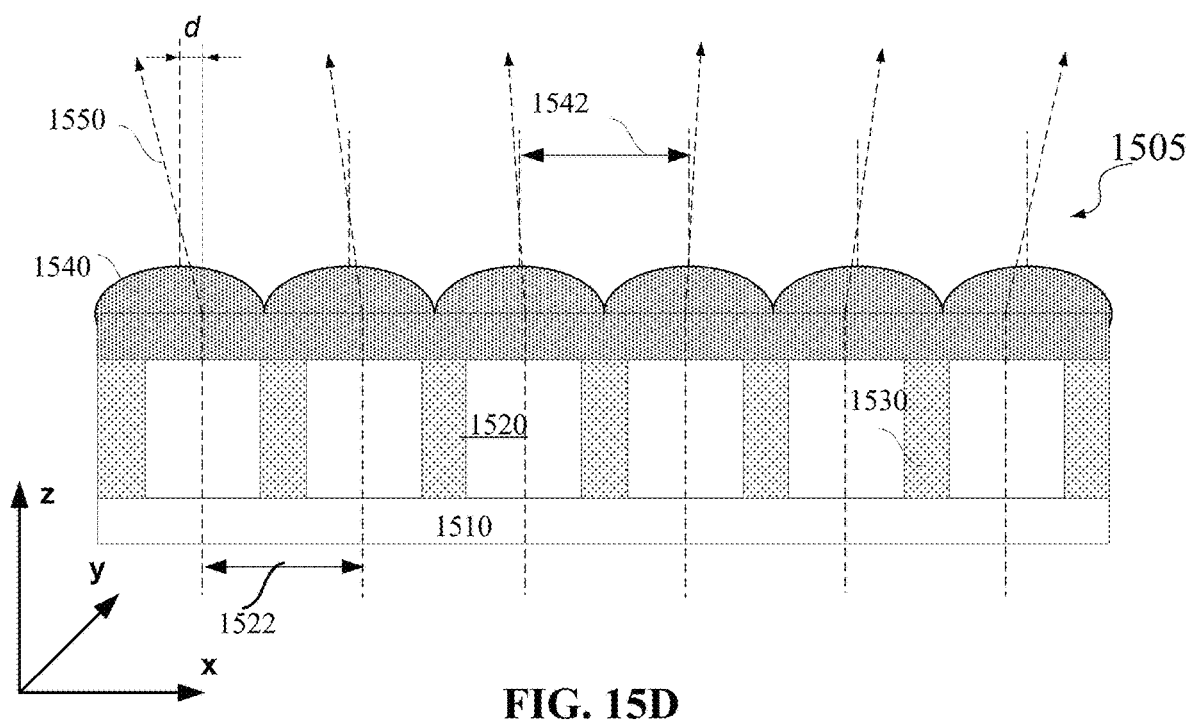
FIG. 15D illustrates another example of a micro-LED device including a micro-LED array and a micro-lens array offset with respect to the micro-LED array for extracting and deflecting light from the micro-LED array.

FIG. 15D illustrates another example of a micro-LED device 1505. Micro-LED device 1505 may be similar to micro-LED device 1500, but may have different displacement d between micro-LED array 1520 and micro-lens array 1540. In micro-LED device 1505 shown in FIG. 15D, pitch 1522 of micro-LED array 1520 may be smaller than pitch 1542 of micro-lens array 1540, and thus the optical axis of each micro-lens in micro-lens array 1540 may be displaced from the center of a respective micro-LED in micro-LED array 1520 by a different respective displacement d. The displacement d may be a function of the location of the micro-LED. For example, the displacement d may linearly increase as a function of the distance of the micro-LED from the center of micro-LED device 1505. As a result, the light beams from the micro-LEDs may be deflected by the corresponding micro-lenses to different directions as shown by lines 1550 and may diverge as shown in the example. Micro-LED device 1505 may be used as display panel 1410 of near-eye display 1400 to improve the coupling efficiency and brightness uniformity.

In various embodiments, the pitch 1542 of micro-lens array 1540 may be uniform or non-uniform. For example, the pitch of a two-dimensional micro-lens array may be uniform in two orthogonal directions, uniform in one direction only, or non-uniform in both directions. The pitch may also be the same or different in the two orthogonal directions.

In many circumstances, for example, when the FWHM angular ranges of light beams emitted from an array of micro-LEDs and extracted and deflected by an array of micro-lenses are large, and/or when the chief ray angles are large, deflecting the light beams emitted from the array of micro-LEDs by the array of micro-lenses with deflection angles matching the chief ray angles from the micro-LEDs as described above with respect to FIGS. 15A-15D may not achieve the highest coupling efficiency and intensity uniformity for the light beams.

Figure 16B:
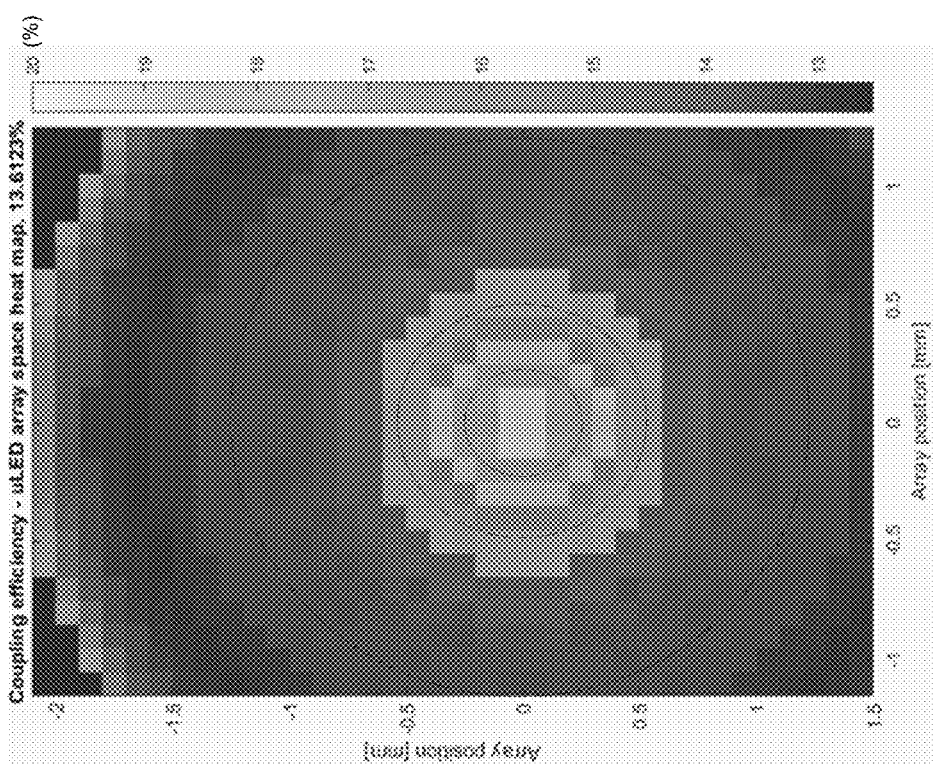
FIG. 16B illustrates efficiencies of coupling light from micro-LEDs to a near-eye display when the micro-lenses are displaced with respect to the micro-LEDs according to the displacement map of FIG. 16A.
Figure 16A:
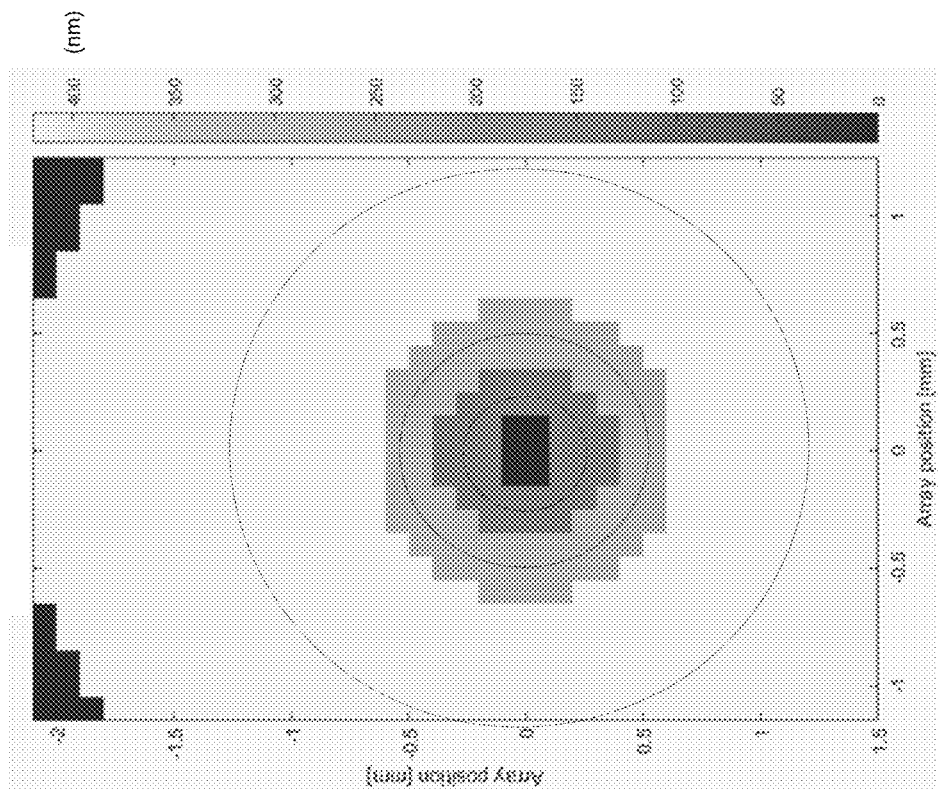
FIG. 16A is a displacement map showing displacements between micro-lenses and micro-LEDs at different regions of a micro-LED array of a near-eye display such that the deflection angles of light beams emitted from the micro-LEDs by the micro-lenses may match the chief ray angles from the micro-LEDs at different regions of the micro-LED array.

FIG. 16A includes an example of a displacement map 1600 showing displacements between micro-lenses and micro-LEDs at different regions of a micro-LED array of a near-eye display such that deflection angles of light beams emitted from the micro-LEDs by the micro-lenses may match the chief ray angles from the micro-LEDs at different regions of the micro-LED array. In the illustrated example, the displacements between the micro-LEDs and the corresponding micro-lenses may be at a first value or within a first range (e.g., about 0 nm) at a center region of the micro-LED array. The displacements between the micro-LEDs and the corresponding micro-lenses may be at a second value or within a second range (e.g., around 100 nm) at a second region adjacent to the center region of the micro-LED array. The displacements between the micro-LEDs and the corresponding micro-lenses may be at a third value or within a third range (e.g., around 250 nm) at a third region outside of the second region of the micro-LED array. The displacements between the micro-LEDs and the corresponding micro-lenses may be at a fourth value or within a fourth range (e.g., around 400 nm) at a fourth region outside of the third region of the micro-LED array.

FIG. 16B includes an example of a coupling efficiency map 1605 illustrating efficiencies of coupling light from micro-LEDs to an eyebox of a near-eye display when the micro-lenses are displaced with respect to the micro-LEDs according to displacement map 1600 of FIG. 16A. As illustrated by coupling efficiency map 1605, the light coupling efficiencies may be high for micro-LEDs within the center region of the micro-LED array, but may be low at regions outside of the center region of the micro-LED array. The total coupling efficiency in the example shown in FIGS. 16A and 16B may be about 13.6%, and the brightness of the images projected by the near-eye display system may be nonuniform.

As described above with respect to FIGS. 13A-14, mismatch between the deflection angle and the chief ray angle may significantly decrease the coupling efficiency, in particular, when the light beam has a small FWHM angular range. FIGS. 16A-16B show that the coupling efficiency of the light beam emitted by a micro-LED away from the center of the micro-LED array may still be low even if the deflection angle of the light beam matches the chief ray angle for the micro-LED. One reason why the coupling efficiency may be low when the deflection angle matches the chief ray angle is that, when the light beam is extracted and deflected by a micro-lens that may be displaced with respect to the micro-LED, the light extraction efficiency and the beam profile of the extracted and deflected light beam may change with the change of the displacement and deflection angle, which may also affect the coupling efficiency.

Figure 17A:
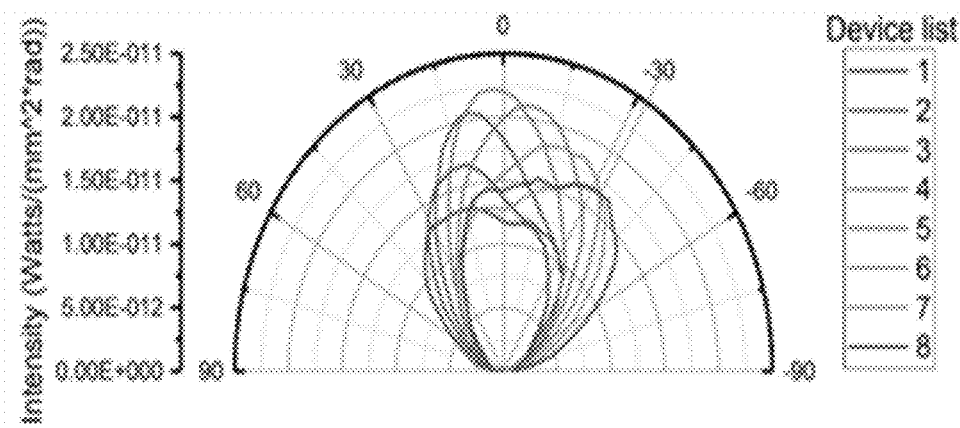
FIG. 17A illustrates examples of beam profiles of individual micro-LEDs with different deflection angles.

FIG. 17A illustrates examples of beam profiles of individual micro-LEDs with different deflection angles. As illustrated, the peak luminance direction of the light beam emitted by a micro-LED may be changed by a respective micro-lens that may be displaced with respect to the micro-LED. In addition, the peak luminance of the deflected light beam may be reduced and the beam profile of the deflected light beam may change (e.g., de-focused), as the displacement and the deflection angle increases.

Figure 17B:
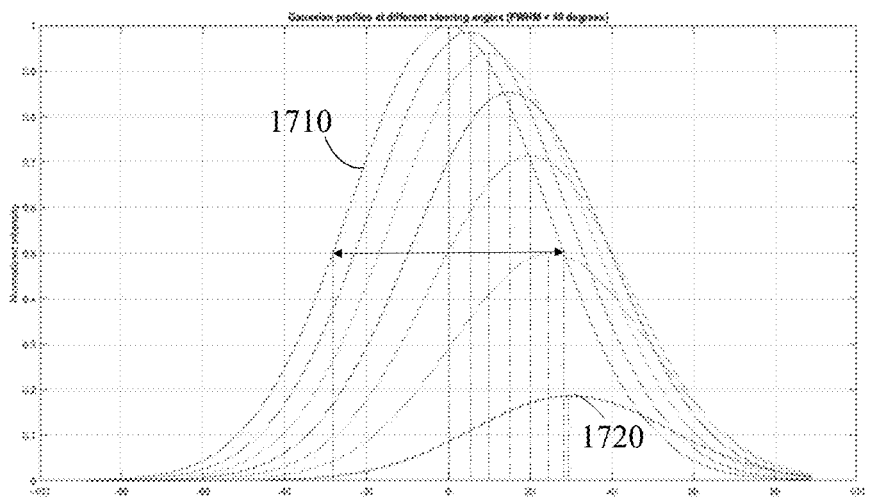
FIG. 17B illustrates examples of beam profiles of LED light extracted and deflected by micro-lenses at different deflection angles.

FIG. 17B illustrates examples of beam profiles of LED light extracted and deflected by micro-lenses at different deflection angles, such as 0°, 5°, 10°, . . . , and 30°. For example, a curve 1710 in FIG. 17B shows a Gaussian beam profile of a light beam extracted from a micro-LED by a micro-lens that is aligned with the micro-LED, where the peak luminance direction may be at 0° with respect to the surface-normal direction of the micro-LED array, and the FWHM angular range may be about 40°. As the deflection angle increases, the peak luminance of the deflected light beam may reduce significantly and the beam profile of the deflected light beam may be skewed from the Gaussian beam profile shown by curve 1710. For example, a curve 1720 shows the beam profile of a light beam extracted from a micro-LED by a micro-lens that is displaced with respect to the micro-LED, where the peak luminance direction may be at about 30° with respect to the surface-normal direction of the micro-LED array, and the peak luminance may be less than about 20% of the peak luminance shown in curve 1710. In addition, the FWHM angular range of the deflected light beam may increase as the deflection angle increases.

Figure 17C:
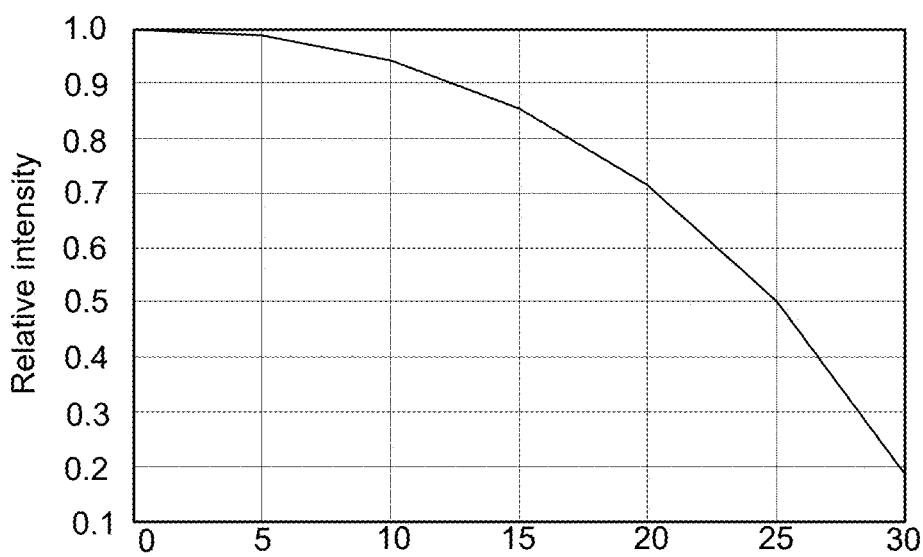
FIG. 17C illustrates an example of intensity drop with the increase of the deflection angle in a near-eye display when the deflection angles of the light beams emitted by the micro-LEDs match the chief ray angles from the micro-LEDs.

FIG. 17C illustrates an example of intensity drop with the increase of the deflection angle in a near-eye display when the deflection angles of the light beams emitted by micro-LEDs and deflected by micro-lenses match the chief ray angles from the micro-LEDs. The beam profiles of the light beams extracted and deflected by the micro-lenses are shown in FIG. 17B. In the illustrated example, the coupling efficiency may drop significantly (e.g., to below 20% of the peak coupling efficiency), when the deflection angles of the light beams emitted by the micro-LEDs match the chief ray angles from the micro-LEDs.

According to certain embodiments, to improve the coupling efficiencies of light emitted by micro-LEDs of a micro-LED array and extracted and deflected by micro-lenses in a near-eye display, the displacements between micro-lenses and corresponding micro-LEDs may be selected based on the beam profiles of the light beams emitted by the micro-LEDs and extracted by the micro-lenses, and the positions of the micro-LEDs with respect to the display optics. The deflection angles of the light beams emitted by the micro-LEDs and extracted and deflected by the micro-lenses may not match (e.g., may be smaller than) the chief ray angles of the display optics for the micro-LEDs at different regions of the micro-LED array. For example, when the FWHM angular range of the light beam emitted by a micro-LED is large (e.g., greater than about 10° or) 20° and/or the chief ray angle of the display optics with respect to the micro-LED is large (e.g., equal to or greater than about 5° or) 10°, the corresponding micro-lens may be positioned such that it may deflect the light beam emitted from the micro-LED by a deflection angle that is smaller than the chief ray angle of the display optics with respect to the micro-LED. In some embodiments, the deflection angle may be between about 20% and about 80% of the chief ray angle. In some embodiments, the difference between the deflection angle and the chief ray angle may increase as the chief ray angle increases. In some embodiments, the difference between the deflection angle and the chief ray angle may increase as the FWHM angular range of the light beam increases.

Figure 18C:
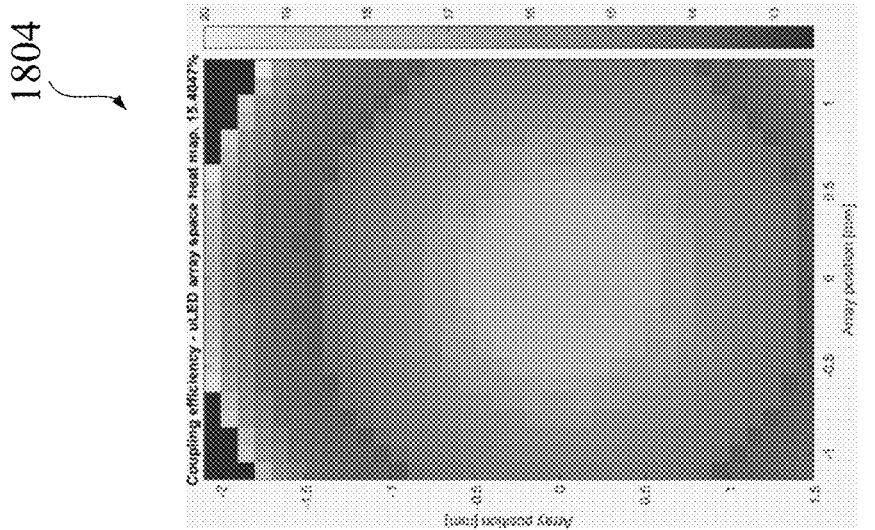
FIG. 18C illustrates efficiencies of coupling light from micro-LEDs to a near-eye display when the micro-lenses are offset with respect to the micro-LEDs according to the displacement map of FIG. 18B.
Figure 18B:
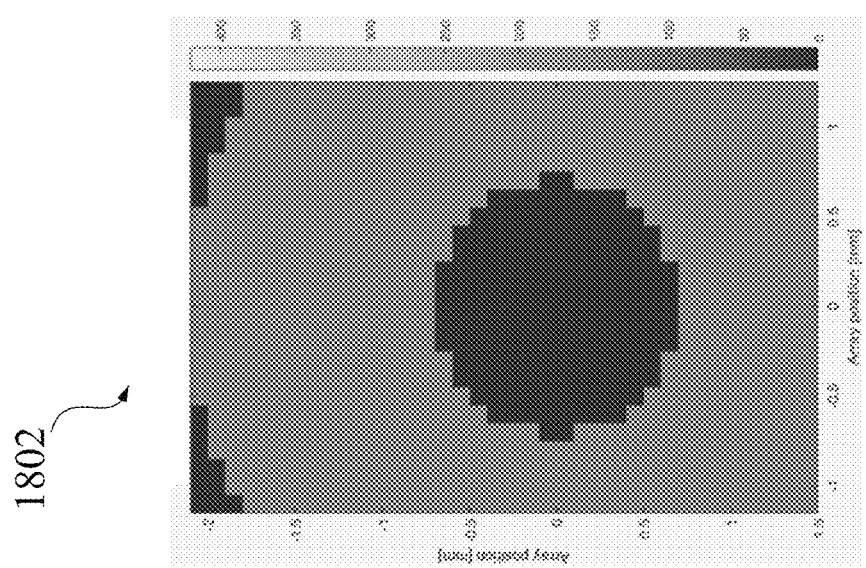
FIG. 18B includes a displacement map showing displacements between micro-lenses and micro-LEDs at different regions of a micro-LED array of a near-eye display, such that the deflection angles of light beams emitted from the micro-LEDs by the micro-lenses may not match the chief ray angles from the micro-LEDs at some regions of the micro-LED array according to certain embodiments.
Figure 18A:
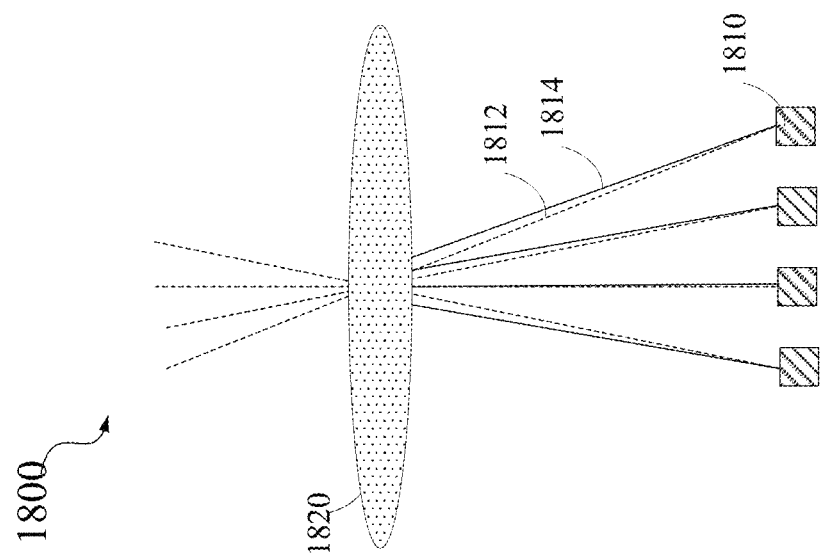
FIG. 18A illustrates an example of a micro-LED device including a micro-LED array and a micro-lens array where the deflection angles of light beams emitted from the micro-LEDs by the micro-lenses are different from the chief ray from the micro-LEDs according to certain embodiments.

FIG. 18A illustrates an example of a display system 1800 that includes display optics 1820 and a micro-LED device 1810 including a micro-LED array and a micro-lens array according to certain embodiments. In the illustrated example, the deflection angles of light beams from the micro-LEDs by the micro-lenses (as indicated by lines 1814) may be different from (e.g., smaller than) the angles of chief rays 1812 from micro-LEDs that are not at the center of the micro-LED array.

FIG. 18B includes an example of a displacement map 1802 showing displacements between micro-lenses and micro-LEDs at different regions of a micro-LED array of a near-eye display according to certain embodiments, where the deflection angles of light beams emitted from the micro-LEDs by the micro-lenses may not match (e.g., smaller than) the chief ray angles from the micro-LEDs at some regions of the micro-LED array. In the illustrated example, the displacements between the micro-LEDs and the corresponding micro-lenses may be at a first value or within a first range (e.g., around 0 nm) at a center region of the micro-LED array, and the displacements between the micro-LEDs and the corresponding micro-lenses may be at a second value or within a second range (around about 100 nm or 150 nm) at regions outside of the center region of the micro-LED array. Compared with the displacement map shown in FIG. 16A, the displacement between a micro-LED at a location of the micro-LED array and the corresponding micro-lens shown in FIG. 18B may be smaller than the displacement between a micro-LED at the same location of the micro-LED array and the corresponding micro-lens shown in FIG. 16A.

FIG. 18C includes an example of a coupling efficiency map 1804 illustrating efficiencies of coupling light from micro-LEDs to an eye box of a near-eye display when the micro-lenses are displaced with respect to the micro-LEDs according to displacement map 1802 of FIG. 18B. Compared with the coupling efficiencies shown in coupling efficiency map 1605, the light coupling efficiencies shown in coupling efficiency map 1804 may be higher, in particular, for micro-LEDs outside of the center region of the micro-LED array, and the coupling efficiencies may be more uniform. The total coupling efficiency in the example shown in FIGS. 18B and 18C may be about 15.4% (an improvement about 13% over the 13.6% total coupling efficiency shown in FIG. 16B), and the brightness of the images projected by the near-eye display system may be more uniform.

FIG. 19A includes a table showing examples of deflecting light beams emitted from an array of micro-LEDs by an array of micro-lenses at angles matching the chief ray angles from the micro-LEDs. In the examples shown FIG. 19A, the deflection angles match the chief ray angles for light beams with different beam profiles, for example, having different FWHM angular ranges such as between about 10° and about 80°.

FIG. 19B illustrates examples of deflecting light beams emitted from an array of micro-LEDs by an array of micro-lenses at angles equal to or smaller than the chief ray angles of the display optics with respect to the micro-LEDs to improve the coupling efficiency and brightness uniformity according to certain embodiments. The deflection angles may be determined based on the beam profiles (e.g., FWHM angular ranges) of the light beams and the chief ray angles. For example, when the FWHM angular range is large and/or when the chief ray angle is large, the deflection angles may be much smaller than the chief ray angles.

FIG. 19C illustrates the absolute differences (in degrees) between the deflection angles of the light beams emitted from an array of micro-LEDs and deflected by an array of micro-lenses as shown in FIG. 19B and the chief ray angles from the micro-LEDs for different beam profiles (e.g., different FWHM angular ranges) of the emitted light beams according to certain embodiments. As illustrated, the absolute difference (in degrees) may increase as the FWHM angular range of the light beam increases, and may also increase as the chief ray angle increases.

FIG. 19D illustrates ratios (in percent) between the deflection angles of the light beams emitted from an array of micro-LEDs and deflected by an array of micro-lenses as shown in FIG. 19B and the chief ray angles from the micro-LEDs for different beam profiles of the emitted light beams according to certain embodiments. As illustrated, the ratios (in percent) between the deflection angles and the chief ray angles may decrease as the FWHM angular range of the light beam increases. FIG. 19D shows that, to achieve higher coupling efficiencies, the deflection angles may be larger than zero and smaller than about 90% (e.g., between about 20% and about 80%) of the chief ray angles from the micro-LEDs.

Even though refractive micro-lenses are used in some embodiments described above to extract, collimate, and deflect light emitted by micro-LEDs, other optical elements, such as prisms, gratings, diffractive lenses, and geometric phase lenses, can also be used to extract, collimate, and deflect the light emitted by micro-LEDs. The micro-LEDs may include, for example, micro-OLEDs, III-V semiconductor micro-LEDs, QLEDs, QDEL devices, and Perovskite LEDs.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Figure 20:
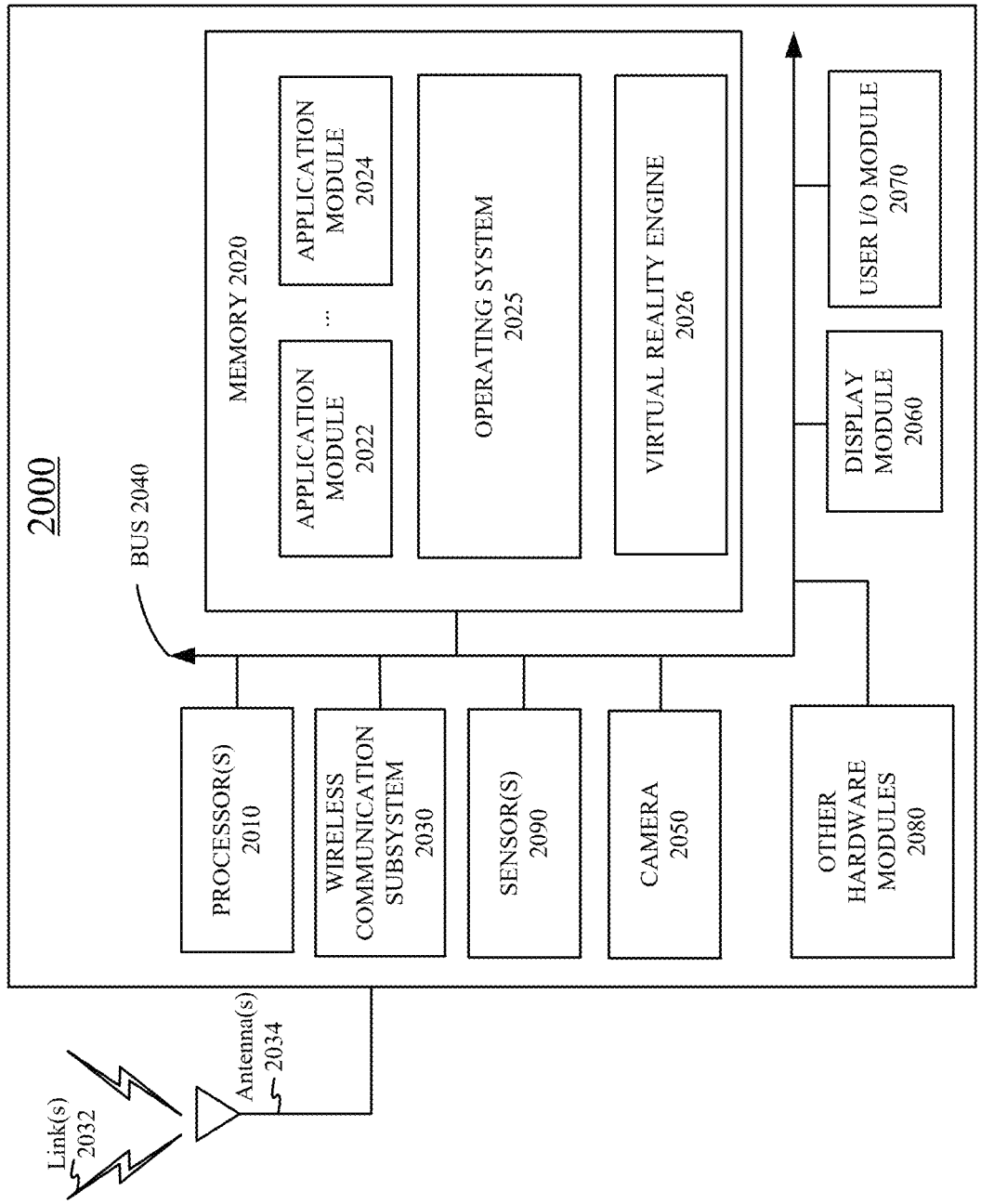
FIG. 20 is a simplified block diagram of an example of an electronic system of a near-eye display according to certain embodiments.

FIG. 20 is a simplified block diagram of an example of an electronic system 2000 of a near-eye display (e.g., HMD device) for implementing some of the examples disclosed herein. Electronic system 2000 may be used as the electronic system of an HMD device or other near-eye displays described above. In this example, electronic system 2000 may include one or more processor(s) 2010 and a memory 2020. Processor(s) 2010 may be configured to execute instructions for performing operations at a number of components, and can be, for example, a general-purpose processor or microprocessor suitable for implementation within a portable electronic device. Processor(s) 2010 may be communicatively coupled with a plurality of components within electronic system 2000. To realize this communicative coupling, processor(s) 2010 may communicate with the other illustrated components across a bus 2040. Bus 2040 may be any subsystem adapted to transfer data within electronic system 2000. Bus 2040 may include a plurality of computer buses and additional circuitry to transfer data.

Memory 2020 may be coupled to processor(s) 2010. In some embodiments, memory 2020 may offer both short-term and long-term storage and may be divided into several units. Memory 2020 may be volatile, such as static random access memory (SRAM) and/or dynamic random access memory (DRAM) and/or non-volatile, such as read-only memory (ROM), flash memory, and the like. Furthermore, memory 2020 may include removable storage devices, such as secure digital (SD) cards. Memory 2020 may provide storage of computer-readable instructions, data structures, program modules, and other data for electronic system 2000. In some embodiments, memory 2020 may be distributed into different hardware modules. A set of instructions and/or code might be stored on memory 2020. The instructions might take the form of executable code that may be executable by electronic system 2000, and/or might take the form of source and/or installable code, which, upon compilation and/or installation on electronic system 2000 (e.g., using any of a variety of generally available compilers, installation programs, compression/decompression utilities, etc.), may take the form of executable code.

In some embodiments, memory 2020 may store a plurality of application modules 2022 through 2024, which may include any number of applications. Examples of applications may include gaming applications, conferencing applications, video playback applications, or other suitable applications. The applications may include a depth sensing function or eye tracking function. Application modules 2022-2024 may include particular instructions to be executed by processor(s) 2010. In some embodiments, certain applications or parts of application modules 2022-2024 may be executable by other hardware modules 2080. In certain embodiments, memory 2020 may additionally include secure memory, which may include additional security controls to prevent copying or other unauthorized access to secure information.

In some embodiments, memory 2020 may include an operating system 2025 loaded therein. Operating system 2025 may be operable to initiate the execution of the instructions provided by application modules 2022-2024 and/or manage other hardware modules 2080 as well as interfaces with a wireless communication subsystem 2030 which may include one or more wireless transceivers. Operating system 2025 may be adapted to perform other operations across the components of electronic system 2000 including threading, resource management, data storage control and other similar functionality.

Wireless communication subsystem 2030 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2000 may include one or more antennas 2034 for wireless communication as part of wireless communication subsystem 2030 or as a separate component coupled to any portion of the system. Depending on desired functionality, wireless communication subsystem 2030 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2030 may permit data to be exchanged with a network, other computer systems, and/or any other devices described herein. Wireless communication subsystem 2030 may include a means for transmitting or receiving data, such as identifiers of HMD devices, position data, a geographic map, a heat map, photos, or videos, using antenna(s) 2034 and wireless link(s) 2032. Wireless communication subsystem 2030, processor(s) 2010, and memory 2020 may together comprise at least a part of one or more of a means for performing some functions disclosed herein.

Embodiments of electronic system 2000 may also include one or more sensors 2090. Sensor(s) 2090 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2090 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or any combination thereof. The position sensors may be located external to the IMU, internal to the IMU, or any combination thereof. At least some sensors may use a structured light pattern for sensing.

Electronic system 2000 may include a display module 2060. Display module 2060 may be a near-eye display, and may graphically present information, such as images, videos, and various instructions, from electronic system 2000 to a user. Such information may be derived from one or more application modules 2022-2024, virtual reality engine 2026, one or more other hardware modules 2080, a combination thereof, or any other suitable means for resolving graphical content for the user (e.g., by operating system 2025). Display module 2060 may use LCD technology, LED technology (including, for example, OLED, ILED, µ-LED, AMOLED, TOLED, etc.), light emitting polymer display (LPD) technology, or some other display technology.

Electronic system 2000 may include a user input/output module 2070. User input/output module 2070 may allow a user to send action requests to electronic system 2000. An action request may be a request to perform a particular action. For example, an action request may be to start or end an application or to perform a particular action within the application. User input/output module 2070 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2000. In some embodiments, user input/output module 2070 may provide haptic feedback to the user in accordance with instructions received from electronic system 2000. For example, the haptic feedback may be provided when an action request is received or has been performed.

Electronic system 2000 may include a camera 2050 that may be used to take photos or videos of a user, for example, for tracking the user's eye position. Camera 2050 may also be used to take photos or videos of the environment, for example, for VR, AR, or MR applications. Camera 2050 may include, for example, a complementary metal-oxide-semiconductor (CMOS) image sensor with a few millions or tens of millions of pixels. In some implementations, camera 2050 may include two or more cameras that may be used to capture 3-D images.

In some embodiments, electronic system 2000 may include a plurality of other hardware modules 2080. Each of other hardware modules 2080 may be a physical module within electronic system 2000. While each of other hardware modules 2080 may be permanently configured as a structure, some of other hardware modules 2080 may be temporarily configured to perform specific functions or temporarily activated. Examples of other hardware modules 2080 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2080 may be implemented in software.

In some embodiments, memory 2020 of electronic system 2000 may also store a virtual reality engine 2026. Virtual reality engine 2026 may execute applications within electronic system 2000 and receive position information, acceleration information, velocity information, predicted future positions, or any combination thereof of the HMD device from the various sensors. In some embodiments, the information received by virtual reality engine 2026 may be used for producing a signal (e.g., display instructions) to display module 2060. For example, if the received information indicates that the user has looked to the left, virtual reality engine 2026 may generate content for the HMD device that mirrors the user's movement in a virtual environment. Additionally, virtual reality engine 2026 may perform an action within an application in response to an action request received from user input/output module 2070 and provide feedback to the user. The provided feedback may be visual, audible, or haptic feedback. In some implementations, processor(s) 2010 may include one or more graphic processing units GPUs that may execute virtual reality engine 2026.

In various implementations, the above-described hardware and modules may be implemented on a single device or on multiple devices that can communicate with one another using wired or wireless connections. For example, in some implementations, some components or modules, such as GPUs, virtual reality engine 2026, and applications (e.g., tracking application), may be implemented on a console separate from the head-mounted display device.

In some implementations, one console may be connected to or support more than one HMD. In alternative configurations, different and/or additional components may be included in electronic system 2000. Similarly, functionality of one or more of the components can be distributed among the components in a manner different from the manner described above. For example, in some embodiments, electronic system 2000 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and" and "or," as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, or the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A near-eye display system comprising:
a light source including an array of micro light emitting diodes (micro-LEDs) configured to emit light beams;
display optics configured to project the light beams emitted by the array of micro-LEDs to a user's eye; and
an array of optical elements between the array of micro-LEDs and the display optics, the array of optical elements configured to extract and direct the light beams emitted by the array of micro-LEDs towards the display optics,
wherein an optical element of the array of optical elements is configured to deflect a light beam emitted by a micro-LED of the array of micro-LEDs at a deflection angle that is greater than 0° and is smaller than 90% of a chief ray angle from the micro-LED, and
wherein the array of micro-LEDs is arranged in a plurality of regions each configured for different respective deflection angles such that optical elements of the array of optical elements that are within each region of the plurality of regions are configured at a similar deflection angle for the region.

2. The near-eye display system of claim 1, wherein the deflection angle is equal to or less than 80% of the chief ray angle, and is equal to or greater than 20% of the chief ray angle.

3. The near-eye display system of claim 1, wherein the deflection angle is less than 50% of the chief ray angle.

4. The near-eye display system of claim 1, wherein a difference between the deflection angle and the chief ray angle increases as the chief ray angle increases.

5. The near-eye display system of claim 1, wherein the array of optical elements is configured to deflect light beams from the array of micro-LEDs by different deflection angles that gradually increase from a center of the array of micro-LEDs to an edge of the array of micro-LEDs.

6. The near-eye display system of claim 1, wherein the deflection angle is selected based on the chief ray angle and a beam profile of the light beam.

7. The near-eye display system of claim 1, wherein a full-width-half-magnitude angular range of a beam profile of the light beam is equal to or greater than 40°.

8. The near-eye display system of claim 1, wherein:
the array of optical elements includes an array of micro-lenses, each micro-lens of the array of micro-lenses corresponding to a micro-LED of the array of micro-LEDs; and
at least one micro-lens of the array of micro-lenses is displaced with respect to a corresponding micro-LED of the array of micro-LEDs.

9. The near-eye display system of claim 8, wherein the array of micro-lenses is characterized by a non-uniform pitch.

10. The near-eye display system of claim 1, wherein a pitch of the array of micro-LEDs is non-uniform.

11. The near-eye display system of claim 1, wherein the array of optical elements includes prisms, gratings, refractive lenses, diffractive lenses, or geometric phase lenses.

12. The near-eye display system of claim 1, wherein the array of micro-LEDs includes:
an array of micro-organic light emitting diodes (micro-OLEDs); or
an array of III-V semiconductor micro-LEDs.

13. A near-eye display system comprising:
a light source including an array of micro light emitting diodes (micro-LEDs) configured to emit light beams;
an array of micro-lenses on the array of micro-LEDs, wherein each micro-lens of the array of micro-lenses corresponds to a micro-LED of the array of micro-LEDs and is configured to extract and direct a light beam emitted by the micro-LED; and
display optics configured to receive and project the light beams directed by the array of micro-lenses to a user's eye,
wherein a micro-lens of the array of micro-lenses is displaced from a corresponding micro-LED of the array of micro-LEDs and is configured to deflect a light beam emitted by the corresponding micro-LED at a deflection angle smaller than a chief ray angle from the micro-LED, and
wherein the array of micro-LEDs is arranged in a plurality of regions each configured for different respective displacement ranges with respect to corresponding micro-LEDs of the array of micro-LEDs such that the micro-lenses of the array of micro-lenses that are within each region of the plurality of regions are configured at a similar displacement range.

14. The near-eye display system of claim 13, wherein a difference between the deflection angle and the chief ray angle increases as the chief ray angle increases.

15. The near-eye display system of claim 13, wherein the deflection angle is equal to or less than 80% of the chief ray angle, and is equal to or greater than 20% of the chief ray angle.

16. The near-eye display system of claim 13, wherein the deflection angle is selected based on the chief ray angle and a beam profile of the light beam.

17. The near-eye display system of claim 13, wherein:
a pitch of the array of micro-lenses is non-uniform;
a pitch of the array of micro-LEDs is non-uniform; or
both.

18. The near-eye display system of claim 13, wherein the array of micro-lenses is configured to direct light beams emitted from a zone of the array of micro-LEDs by a same deflection angle.

19. The near-eye display system of claim 13, wherein a displacement between the micro-lens and the corresponding micro-LED is non-uniform across the array of micro-LEDs.

20. The near-eye display system of claim 1, wherein the plurality of regions are defined radially outward from a center of the array of micro-LEDs.

* * * * *